US011859131B2

United States Patent
Goto et al.

(10) Patent No.: US 11,859,131 B2
(45) Date of Patent: *Jan. 2, 2024

(54) ELECTROCHROMIC COMPOUND, ELECTROCHROMIC COMPOSITION, AND ELECTROCHROMIC ELEMENT

(71) Applicant: Ricoh Company, Ltd., Tokyo (JP)

(72) Inventors: Daisuke Goto, Kanagawa (JP); Masato Shinoda, Kanagawa (JP); Toshiya Sagisaka, Kanagawa (JP); Yuto Matsuoka, Tokyo (JP); Fuminari Kaneko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,870

(22) Filed: May 3, 2022

(65) Prior Publication Data

US 2022/0290041 A1 Sep. 15, 2022

Related U.S. Application Data

(63) Continuation of application No. 17/259,427, filed as application No. PCT/JP2019/029025 on Jul. 24, 2019, now Pat. No. 11,370,963.

(30) Foreign Application Priority Data

Jul. 25, 2018 (JP) .................................. 2018-139830
Jul. 19, 2019 (JP) .................................. 2019-133425

(51) Int. Cl.
C09K 9/02 (2006.01)
G02F 1/155 (2006.01)
G02F 1/1516 (2019.01)

(52) U.S. Cl.
CPC ................ *C09K 9/02* (2013.01); *G02F 1/155* (2013.01); *G02F 1/15165* (2019.01);
(Continued)

(58) Field of Classification Search
CPC .............. C09K 9/02; C09K 2211/1007; C09K 2211/1011; C09K 2211/1014;
(Continued)

(56) References Cited

U.S. PATENT DOCUMENTS 11,370,963 B2 * 6/2022 Goto ...................... C09K 11/06
2009/0295275 A1 12/2009 Parham et al.
(Continued)

FOREIGN PATENT DOCUMENTS

CN 103227285 7/2013
CN 104768960 7/2015
(Continued)

OTHER PUBLICATIONS

Chinese Office Action dated Dec. 15, 2022, in Chinese Application No. 201980043650.5, 19 pages.
(Continued)

*Primary Examiner* — Bijan Ahvazi
(74) *Attorney, Agent, or Firm* — Grüneberg and Myers, PLLC

(57) ABSTRACT

An electrochromic compound has a structure represented by the following general formula (1):
(Continued)

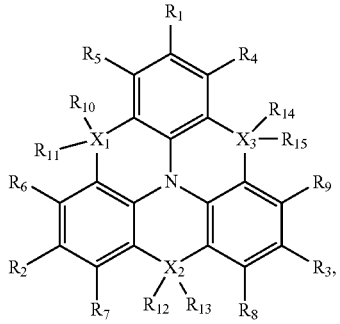

where each of $X_1$ to $X_3$ independently represents a carbon atom or a silicon atom, and each of $R_1$ to $R_{15}$ independently represents a member selected from a hydrogen atom, a halogen atom, a monovalent organic group, and a polymerizable functional group.

4 Claims, 3 Drawing Sheets

(52) U.S. Cl.
CPC ............ C09K 2211/1007 (2013.01); C09K 2211/1011 (2013.01); C09K 2211/1014 (2013.01); C09K 2211/1022 (2013.01); G02F 2201/12 (2013.01)

(58) Field of Classification Search
CPC ............ C09K 2211/1022; G02F 1/155; G02F 1/15165; G02F 2201/12
See application file for complete search history.

(56) References Cited

U.S. PATENT DOCUMENTS

| | | | |
|---|---|---|---|
| 2014/0374733 A1 | 12/2014 | Hiral et al. | |
| 2015/0274761 A1 | 10/2015 | Sagisaka et al. | |
| 2015/0333275 A1* | 11/2015 | Wonneberger | C07D 455/03 136/263 |
| 2016/0005375 A1 | 1/2016 | Naijo et al. | |
| 2016/0108072 A1 | 4/2016 | Inoue et al. | |
| 2016/0209721 A1 | 7/2016 | Matsumoto et al. | |
| 2017/0010514 A1 | 1/2017 | Yashiro et al. | |
| 2017/0131609 A1 | 5/2017 | Okada et al. | |
| 2017/0168366 A1 | 6/2017 | Shinoda et al. | |
| 2017/0226413 A1 | 8/2017 | Goto et al. | |
| 2017/0235203 A1 | 8/2017 | Yamamoto et al. | |
| 2017/0329197 A1 | 11/2017 | Yashiro et al. | |
| 2017/0329198 A1 | 11/2017 | Matsuoka et al. | |
| 2017/0329199 A1 | 11/2017 | Yashiro et al. | |
| 2017/0336691 A1 | 11/2017 | Yamamoto et al. | |
| 2018/0044581 A1 | 2/2018 | Sagisaka et al. | |
| 2018/0113366 A1 | 4/2018 | Kaneko et al. | |
| 2018/0173070 A1 | 6/2018 | Yamamoto et al. | |
| 2018/0208834 A1 | 7/2018 | Goto et al. | |
| 2018/0314125 A1 | 11/2018 | Goto et al. | |
| 2019/0031694 A1 | 1/2019 | Sagisaka et al. | |

FOREIGN PATENT DOCUMENTS

| | | | | |
|---|---|---|---|---|
| CN | 105339376 | | 2/2016 | |
| CN | 106633005 | | 5/2017 | |
| CN | 106800556 | | 6/2017 | |
| EP | 2 182 040 A2 | | 5/2010 | |
| EP | 2 182 040 A3 | | 5/2010 | |
| JP | 62-156172 | | 7/1987 | |
| JP | 62-290768 | | 12/1987 | |
| JP | H05-107784 | | 4/1993 | |
| JP | H11-339868 | | 12/1999 | |
| JP | H11339868 A | * | 12/1999 | ........... C07D 471/14 |
| JP | 2012-507507 | | 3/2012 | |
| JP | 2016-38572 | | 3/2016 | |
| JP | 2016-513077 | | 5/2016 | |
| JP | 2017-7982 | | 1/2017 | |
| JP | 2017-8025 | | 1/2017 | |
| JP | 2017-111434 | | 6/2017 | |
| JP | 2018-118933 | | 8/2018 | |
| WO | WO-2010050778 A1 | * | 5/2010 | ............. C09K 11/06 |
| WO | 2014/111365 | | 7/2014 | |

OTHER PUBLICATIONS

Bettina D. Gliemann et al., "Dithiafulvenyl-Extended N-Heterotriangulenes and Their Interaction with C 60: Cooperative Fluorescence", Chemistry ~ A European Journal, vol. 23, No. 50, Jun. 2, 2017, pp. 12353-12362.

Christian Steiner et al., "Self-Assembly and Stability of Hydrogen-Bonded Networks of Bridged Triphenylamines on Au(111) and Cu(111)", Journal Of Physical Chemistry C, vol. 119, No. 46, Oct. 27, 2015, pp. 25945-25955.

Cui Liu et al., "Solution-Processed, Undoped, Deep-Blue Organic Light-Emitting Diodes Based on Starburst Oligofluorenes with a Planar Triphenylamine Core", Chemistry ~ A European Journal, vol. 18, No. 22, Apr. 26, 2012, pp. 6928-6934.

Dan-Xia Zhao et al., "Three-dimensional D-[pi]-A organic sensitizer with coplanar triphenylamine moiety for dye-sensitized solar cells", Dyes and pigments, Elsevier Applied Science Publishers, Barking, GB, vol. 140, Jan. 21, 2017, pp. 278-285.

Fei Wu et al., "Novel D-[pi]-A organic sensitizers containing diarylmethylene-bridged triphenylamine and different spacers for solar cell application", Tetrahedron Letters, vol. 56, No. 10, Mar. 1, 2015, pp. 1233-1238.

Fei Wu et al., "Novel organic dyes based on diarylmethylene-bridged triphenylamine for dye-sensitized solar cells", Synthetic Metals, Elsevier Sequoia, Lausanne, CH, vol. 205, Apr. 5, 2015, pp. 70-77.

Florian Schlütter et al., "[pi]-Conjugated Heterotriangulene Macrocycles by Solution and Surface-supported Synthesis toward Honeycomb Networks", Journal of the American Chemical Society, vol. 135, No. 11, Feb. 25, 2013, pp. 4550-4557.

Huanhuan Li et al., "Efficient synthesis of Π-extended phenazasilines for optical and electronic applications", Chem. Commun., 2014, vol. 50, pp. 15760-15763.

International Search Report and Written Opinion dated Oct. 2, 2019 in PCT/JP2019/029026 filed on Jul. 24, 2019.

Jeum-Jong Kim et al., "A New Ruthenium Sensitizer Containing Benzo[1,9]quinolizino(acridin-2-yl)vinyl-2,2'-bipyridine Ligand for Effective Nanocrystalline Dye-Sensitized Solar Cells", International Journal of Photoenergy, vol. 2012, Jan. 1, 2012, pp. 1-7, 8 total pages.

Kathrin Müller et al., "Cyano-Functionalized Triarylamines on Coinage Metal Surfaces: Interplay of Intermolecular and Molecule-Substrate Interactions", Chemistry ~ A European Journal, vol. 22, No. 2, Dec. 4, 2015, pp. 581-589.

Kwangseok Do et al., "New Type of Organic Sensitizers with a Planar Amine Unit for Efficient Dye-Sensitized Solar Cells", Organic Letters, vol. 14, No. 1, Jan. 6, 2012, pp. 222-225.

Milan Kivala et al., "Columnar Self-Assembly in Electron-Deficient Heterotriangulenes", Chemistry ~ A European Journal, vol. 19, No. 25, Jun. 17, 2013, pp. 8117-8128.

Nikolay S. Makarov et al., "Impact of Electronic Coupling, Symmetry, and Planarization on One- and Two-Photon Properties of Triarylamines with One, Two, or Three Diarylboryl Acceptors", Journal of Physical Chemistry. A, Molecules, Spectroscopy, Kinetics, Environment and General Theory, vol. 116, No. 15, Apr. 19, 2012, pp. 3781-3793.

Peng Qin et al., "Weakly Conjugated Hybrid Zinc Porphyrin Sensitizers for Solid-State Dye-Sensitized Solar Cells", Advanced Functional Materials, vol. 26, No. 30. May 25, 2016, pp. 5550-5559.

(56) References Cited

OTHER PUBLICATIONS

Stefano Gottardi et al., "Cyano-Functionalized Triarylamines on Au(111): Competing Intermolecular versus Molecule/Substrate Interactions", Advanced Materials Interfaces, vol. 1, No. 1, Nov. 13, 2013, p. 1300025, 10 total pages.

Zhen Fang et al., "Bridged triphenylamine based molecules with large two-photon absorption cross sections in organic and aqueous media", Chemical Communications, No. 8. Jan. 1, 2009, pp. 920-922.

Zhen Fang et al., "Bridged Triphenylamine-Based Dendrimers: Tuning Enhanced Two-Photon Absorption Performance with Locked Molecular Planarity", Org. Lett., vol. 11, No. 1, 2009, pp. 1-4.

Zhen Fang et al., "Tuning two-photon absorption cross-sections for triphenylamine derivatives", RSC Advances, vol. 3, No. 39, Jan. 1, 2013, pp. 17914-17917.

Zhen Fang et al., "Bridged triarylamine starburst oligomers as hole transporting materials for electroluminescent devices", J. Mater. Chem., 2012, vol. 22, pp. 15397-15404.

Zuoquan Jiang et al., "Star-Shaped Oligotriarylamines with Planarized Triphenylamine Core: Solution-Processable, High-$T_g$ Hole-Injecting and Hole- Transporting Materials for Organic Light-Emitting Devices", Chemistry of Materials, vol. 23, No. 3, Feb. 8, 2011, pp. 771-777.

* cited by examiner

ELECTROCHROMIC COMPOUND, ELECTROCHROMIC COMPOSITION, AND ELECTROCHROMIC ELEMENT

CROSS-REFERENCE TO RELATED APPLICATIONS

This application is a continuation of U.S. application Ser. No. 17/259,427, filed on Jan. 11, 2021, which was the National Stage entry under § 371 of International Application No. PCT/JP2019/029025, filed on Jul. 24, 2019, and which claims the benefit of priority to Japanese Application No. 2019-133425, filed on Jul. 19, 2019; and priority to Japanese Application No. 2018-139830, filed on Jul. 25, 2018. The content of each of these applications is hereby incorporated by reference in its entirety.

TECHNICAL FIELD

The present disclosure relates to an electrochromic compound, an electrochromic composition, and an electrochromic element.

BACKGROUND ART

Electrochromic elements utilizing coloring and decoloring phenomena of electrochromic materials (electrochromic compounds) that cause electrochromism are actively researched and developed lately as potential candidates for display devices such as electronic paper and light shader.

The electrochromic element generally includes an electrolyte layer and an electrochromic layer between a pair of electrodes. As a forward voltage or a reverse voltage is applied to the electrochromic element, the electrochromic compound is colored or decolored.

The electrochromic element is, in principle, capable of reversibly switching between the colorless state and the colored state. The electrochromic element can develop various colors when multiple color-developing layers that develop cyan, magenta, yellow, etc., are laminated therein. Thus, electrochromic elements are expected as multicolor display elements. To apply electrochromic elements to transparent display devices or multicolor display devices, electrochromic compounds need to be colorless and transparent in the decolored state.

As an electrochromic material that is transparent in the neutral state and colored in the oxidized state, for example, Patent Document 1 proposes an electrochromic element using a polymer obtained by polymerizing an electrochromic composition containing a triarylamine.

CITATION LIST

Patent Literature

PTL 1: Japanese Unexamined Patent Application Publication No. 2016-38572

SUMMARY OF INVENTION

Technical Problem

However, although Patent Document 1 describes that the electrochromic element has been improved in light durability for preventing a decrease of light transmittance, nothing is described on improvement of repetition durability for preventing a decrease of coloring property even when coloring/decoloring is repeated.

An object of the present invention is to provide an electrochromic compound having excellent repetition durability and light durability.

Solution to Problem

An electrochromic compound according to an embodiment of the present invention has a structure represented by the following general formula (1):

[Chem. 1]

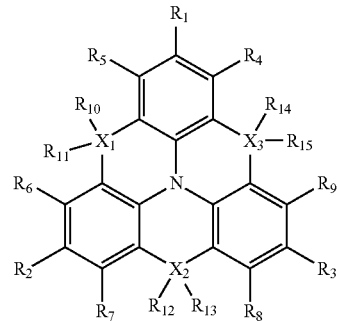

where each of $X_1$ to $X_3$ independently represents a carbon atom or a silicon atom, and each of $R_1$ to $R_{15}$ independently represents a member selected from the group consisting of a hydrogen atom, a halogen atom, a monovalent organic group, and a polymerizable functional group.

Advantageous Effects of Invention

An electrochromic compound according to an embodiment of the present invention has excellent repetition durability and light durability.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
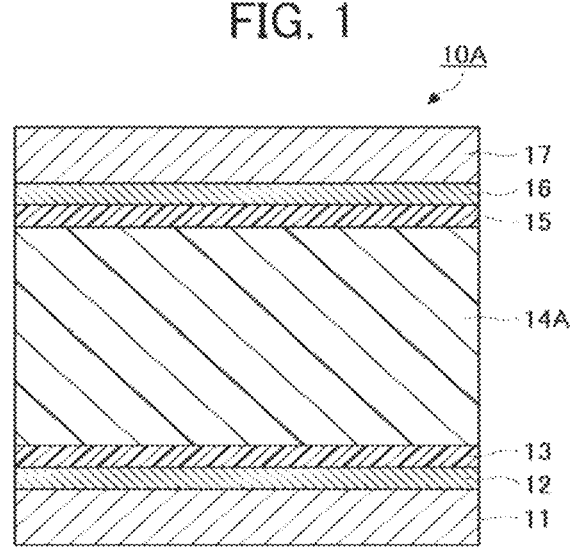
FIG. 1 is a schematic cross-sectional view of an electrochromic element according to a first embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention are described. The embodiments are not limited by the following description and can be appropriately modified without departing from the scope of the present invention.

Electrochromic Compound

The electrochromic compound according to an embodiment has a triarylamine backbone.

Specifically, the electrochromic compound according to an embodiment has a triphenylamine backbone in which the nitrogen atom constituting the triarylamine backbone is substituted with three phenyl groups.

Preferably, the electrochromic compound according to an embodiment is a radical-polymerizable compound having a triarylamine backbone, represented by the following general formula (1).

[Chem. 2]

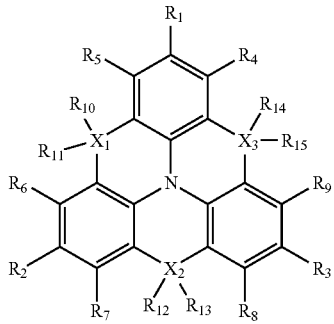

General Formula (1)

In the general formula (1), each of $X_1$ to $X_3$ independently represents a carbon atom or a silicon atom, and each of $R_1$ to $R_{15}$ independently represents a member selected from the group consisting of a hydrogen atom, a halogen atom, a monovalent organic group, and a polymerizable functional group.

Specific examples of the halogen atom include, but are not limited to, fluorine, chlorine, bromine, and iodine.

Specific examples of the monovalent organic group include, but are not limited to, hydroxyl group, nitro group, cyano group, carboxyl group, carbonyl group, amide group, aminocarbonyl group, sulfonate group, sulfonyl group, sulfonamide group, aminosulfonyl group, amino group, alkyl group, alkenyl group, alkynyl group, aryl group, alkoxy group, aryloxy group, alkylthio group, arylthio group, heteroaryl group, and silyl group. Each of these groups may have a substituent.

Specific examples of the monovalent organic group having a substituent include, but are not limited to: substituted carbonyl groups such as alkoxycarbonyl group, aryloxycarbonyl group, alkylcarbonyl group, arylcarbonyl group, monoalkylaminocarbonyl group, dialkylaminocarbonyl group, monoarylaminocarbonyl group, and diarylaminocarbonyl group; substituted sulfonyl groups such as alkoxysulfonyl group, aryloxysulfonyl group, alkylsulfonyl group, arylsulfonyl group, sulfoneamide group, monoalkylaminosulfonyl group, dialkylaminosulfonyl group, monoarylaminosulfonyl group, and diarylaminosulfonyl group; and substituted alkylamino groups such as monoalkylamino group and dialkylamino group. Specific examples of the substituents include, but are not limited to: alkyl groups or alkenyl groups; alkynyl groups; aryl groups; alkoxy groups; aryloxy groups; alkylthio groups; arylthio groups; and heteroaryl groups.

Among these substituents, alkyl groups having 1 or more carbon atoms, alkenyl groups having 2 or more carbon atoms, alkynyl groups having 2 or more carbon atoms, aryl groups having 6 or more carbon atoms, heteroaryl groups having 2 or more carbon atoms, alkoxy groups, aryloxy groups, and heteroaryloxy groups are preferable.

Preferred examples of the alkyl groups having 1 or more carbon atoms include, but are not limited to, straight-chain, branched-chain, or cyclic alkyl groups having 1 to 30 carbon atoms, for material availability. Among the cyclic alkyl groups having 1 to 30 carbon atoms, cyclic alkyl groups having 1 to 18 carbon atoms are particularly preferable.

Specific examples of the alkyl groups having 1 or more carbon atoms include, but are not limited to, methyl group, ethyl group, propyl group, butyl group, tert-butyl group, isopropyl group, isobutyl group, pentyl group, hexyl group, heptyl group, ethylhexyl group, octyl group, decyl group, dodecyl group, 2-butyloctyl group, octadecyl group, cyclopropyl group, cyclobutyl group, cyclopentyl group, cyclohexyl group, and adamantyl group.

Preferred examples of the alkenyl groups having 2 or more carbon atoms include, but are not limited to, straight-chain, branched-chain, or cyclic alkenyl groups having 2 to 30 carbon atoms. Among the cyclic alkenyl groups having 2 to 30 carbon atoms, cyclic alkenyl groups having 1 to 18 carbon atoms are particularly preferable.

An alkenyl group having 2 or more carbon atoms is a substituent obtained by removing arbitrary two hydrogen atoms from an alkyl group having 1 or more carbon atoms. Specific examples of the alkenyl groups having 2 or more carbon atoms include, but are not limited to, vinyl group (ethenyl group), propenyl group, butenyl group, pentenyl group, hexenyl group, heptanyl group, octenyl group, decenyl group, dodecenyl group, octadecenyl group, cyclobutenyl group, cyclopentenyl group, and cyclohexenyl group.

Preferred examples of the alkynyl groups having 2 or more carbon atoms include, but are not limited to, straight-chain, branched-chain, or cyclic alkynyl groups having 2 to 30 carbon atoms. Among the cyclic alkynyl groups having 2 to 30 carbon atoms, cyclic alkynyl groups having 2 to 18 carbon atoms are particularly preferable.

An alkynyl group having 2 or more carbon atoms is a substituent obtained by removing arbitrary four hydrogen atoms from an alkyl group having 1 or more carbon atoms. Specific examples of the alkynyl groups having 2 or more carbon atoms include, but are not limited to, ethynyl group, propynyl group, butynyl group, pentynyl group, hexynyl group, heptynyl group, octynyl group, decynyl group, dodecynyl group, and octadecynyl group.

Specific examples of the aryl groups having 6 or more carbon atoms include, but are not limited to, phenyl group, o-tolyl group, m-tolyl group, p-tolyl group, p-chlorophenyl group, p-fluorophenyl group, p-trifluorophenyl group, naphthyl group, biphenyl group, anthryl group, phenanthryl group, pyrenyl group, fluorenyl group, benzopyrenyl group, and chrysenyl group.

Preferred examples of the heteroaryl groups having 2 or more carbon atoms include, but are not limited to, heteroaryl groups having 2 to 12 carbon atoms.

The heteroaryl group having 2 or more carbon atoms may comprise nitrogen atom, sulfur atom, oxygen atom, silicon atom, and/or selenium atom. Preferably, the heteroaryl group having 2 or more carbon atoms comprises at least one of nitrogen atom, sulfur atom, and oxygen atom.

Specific examples of the heteroaryl groups having 2 or more carbon atoms include, but are not limited to, monocyclic heteroaryl groups and polycyclic heteroaryl groups.

Specific examples of the monocyclic heteroaryl groups include, but are not limited to, pyridine ring, pyrimidine ring, pyridazine ring, pyrazine ring, tetrazine, thiophene ring, furan ring, pyrrole, imidazole, pyrazole, thiazole ring, oxazole ring, isoxazole, oxadiazole ring, triazine ring, tetrazole ring, and triazole ring.

Specific examples of the polycyclic heteroaryl groups include, but are not limited to, quinoline group, isoquinoline group, quinazoline group, phthalazine group, indole group, benzothiophene group, benzofuran group, benzimidazole group, benzothiodiazole group, acridine group, phenoxazine group, phenothiazine group, carbazole group, benzodithiophene group, benzodifuran group, dibenzofuran group, and dibenzothiophene group.

The polycyclic heteroaryl group may be a group in which an aryl group and a heteroaryl group are bound via a covalent bond, or a group in which an aryl group and a heteroaryl group are condensed into a ring. Specific examples of the group in which an aryl group and a heteroaryl group are bound via a covalent bond and the group in which an aryl group and a heteroaryl group are condensed into a ring include, but are not limited to, biphenyl group, terphenyl group, 1-phneylnaphthalene group, and 2-phenylnaphthalene group.

The polymerizable functional group in the general formula (1) is a polymerizable group having a carbon-carbon double bond. Specific examples of the polymerizable functional group include, but are not limited to, 1-substituted ethylene functional groups and 1,1-substituted ethylene functional groups described below.

Specific examples of the 1-substituted ethylene functional groups include, but are not limited to, a functional group represented by the following general formula (i).

[Chem. 3]

  General Formula (i)

In the general formula (i), $X_1$ represents an arylene group, an alkenylene group, —CO— group, —COO— group, —CON($R_{100}$)— group (where $R_{100}$ represents a hydrogen atom, an alkyl group, an aralkyl group, or an aryl group), or —S— group. The arylene group and the alkenylene group each may have a substituent.

Specific examples of the arylene group include, but are not limited to, phenylene group and naphthylene group. The phenylene group may have a substituent.

Specific examples of the alkenylene group include, but are not limited to, ethenylene group, propenylene group, and butenylene group.

Specific examples of the alkyl group include, but are not limited to, methyl group and ethyl group.

Specific examples of the aralkyl group include, but are not limited to, benzyl group, naphthylmethyl group, and phenethyl group.

Specific examples of the aryl group include, but are not limited to, phenyl group and naphthyl group.

Specific examples of the functional group represented by the general formula (i) include, but are not limited to, vinyl group, styryl group, 2-methyl-1,3-butadienyl group, vinyl carbonyl group, acryloyloxy group, acryloylamide group, and vinyl thioether group.

Specific examples of the 1,1-substituted ethylene functional groups include, but are not limited to, a functional group represented by the following general formula (ii).

[Chem. 4]

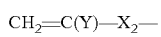  General Formula (ii)

In the general formula (ii), Y represents an alkyl group, an aralkyl group, an aryl group, a halogen atom, cyano group, nitro group, an alkoxy group, or —COOR$_{101}$ group (where $R_{101}$ represents a hydrogen atom, an alkyl group, an aralkyl group, an aryl group, or CONR$_{102}$R$_{103}$ (where each of $R_{102}$ and $R_{103}$ independently represents a hydrogen atom, an alkyl group, an aralkyl group, or an aryl group)). Each of these groups may have a substituent. $X_2$ represents a substituent such as those of $X_1$ in the general formula (i) or an alkylene group. At least one of Y and $X_2$ represents oxycarbonyl group, cyano group, an alkenylene group, or an aromatic ring.

Specific examples of the alkyl group include, but are not limited to, methyl group and ethyl group. Specific examples of the aralkyl group include, but are not limited to, benzyl group, naphthylmethyl group, and phenethyl group. Specific examples of the aryl group include, but are not limited to, phenyl group and naphthyl group. Specific examples of the alkoxy group include, but are not limited to, in addition to methoxy group and ethoxy group, diethylene glycol, dipropylene glycol, triethylene glycol, tripropylene glycol, tetraethylene glycol, tetrapropylene glycol, polyethylene glycol, and propylene glycol, in each of which the unit of ethylene glycol or polypropylene glycol is condensed.

Specific examples of the polymerizable functional group represented by the general formula (ii) include, but are not limited to, α-acryloyloxy chloride group, methacryloyloxy group, α-cyanoethylene group, α-cyanoacryloyloxy group, α-cyanophenylene group, and methacryloyl amino group.

$X_1$, $X_2$, and Y may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Among the functional groups represented by the general formula (i) or (ii), acryloyloxy group and methacryloyloxy group are particularly preferable.

In the general formula (1), the polymerizable functional group is preferably substituted at the terminal of an alkyl group having 1 or more carbon atoms, an aryl group having 6 or more carbon atoms, or an alkyl-substituted aryl group having 7 or more carbon atoms, more preferably at the terminal of an alkyl group, for improving resistance to oxidation and reduction.

Preferably, the polymerizable functional group is bound to the main backbone of the electrochromic compound via at least an alkyl group having 2 or more carbon atoms.

Preferably, each of $R_1$ to $R_3$ independently represents a member selected from the group consisting of a halogen atom, a monovalent organic group, and a polymerizable functional group. Since the para position of the nitrogen atom of the triphenylamine backbone has a high electron density and is reactive, it is preferable that this site be substituted with any substituent other than hydrogen, i.e., of a halogen atom, a monovalent organic group, or a polymerizable functional group.

Preferably, one or more of $R_1$ to $R_9$ each represent a polymerizable functional group. This is because, when the electrochromic compound according to the present embodiment is used as a polymer film, it makes it possible to impart polymerizable property to the electrochromic compound and easy to introduce a substituent thereto.

More preferably, one or more of $R_1$ to $R_3$ each represent a polymerizable functional group.

For preventing the occurrence of color change and a side reaction between molecules at the time when color is developed, preferably, each of $R_1$ to $R_9$ independently represents an alkyl group, an alkoxy group, an aryl group, an aryloxy group, a halogen atom, or a polymerizable functional group. Among the alkyl groups, a tert-butyl group is particularly preferable.

When each of $R_1$ to $R_9$ is a monovalent organic group, preferred examples of the monovalent organic group include alkyl groups having 1 or more carbon atoms, alkenyl groups having 2 or more carbon atoms, alkynyl groups having 2 or more carbon atoms, aryl groups having 6 or more carbon atoms, heteroaryl groups having 2 or more carbon atoms, alkoxy groups having 1 or more carbon atoms, aryloxy groups, and heteroaryloxy groups.

Each of $R_1$ to $R_9$ may be a group in which one or more aryl groups and/or heteroaryl groups are bound via a covalent bond, or a group in which one or more aryl groups and/or heteroaryl groups are condensed into a ring. The group in which one or more aryl groups and/or heteroaryl groups are bound via a covalent bond, or the group in which one or more aryl groups and/or heteroaryl groups are condensed into a ring, contains 1 to 100 carbon atoms and may further contain a hetero atom. The upper limit of the total number of carbon atoms is preferably 50, and more preferably 36. Specific examples of the hetero atom include, but are not limited to, oxygen atom, sulfur atom, and nitrogen atom.

For transparency of the electrochromic compound in the decolored state, preferably, the group in which one or more aryl groups and/or heteroaryl groups are bound via a covalent bond, or the group in which one or more aryl groups and/or heteroaryl groups are condensed into a ring, has an absorption end at 400 nm or less, more preferably at 380 nm or less.

The number of the group in which aryl groups and/or heteroaryl groups are bound via a covalent bond or the group in which aryl groups and/or heteroaryl groups are condensed into a ring may be in the range of from 1 to 6, but is preferably from 1 to 3, and more preferably from 1 to 2. This is because, in contrast to triphenylamine that is a chromophore, the group in which aryl groups and/or heteroaryl groups are bound via a covalent bond and the group in which aryl and/or heteroaryl groups are condensed into a ring do not contribute to color development. Therefore, a significant increase in number of these groups is not preferable for color developing efficiency and material cost.

Preferably, each of $R_{10}$ to $R_{15}$ independently represents a member selected from the group consisting of a halogen atom, a monovalent organic group, and a polymerizable functional group. This is because hydrogen on the benzyl position has a high acidity and is reactive. Therefore, the benzyl position is preferably substituted with a halogen atom, a monovalent organic group, or a polymerizable functional group, other than a hydrogen atom. Preferably, each of $R_{10}$ to $R_{15}$ independently represents an alkyl group, an alkoxy group, an aryl group, a heteroaryl group, a halogen atom, or a polymerizable functional group, and most preferably any of an alkyl group, an alkoxy group, an aryl group, and a polymerizable functional group. Preferably, the polymerizable functional group is present at a part of an alkyl group or an aryl group, particularly at the terminal thereof.

Specific examples of the compound represented by the general formula (1) include, but are not limited to, the following Examples Compounds. In the following Example Compounds, MeO— represents methoxy group. The electrochromic compound according to the present embodiment is not limited to the examples listed below.

Example Compound 1

[Chem. 5]

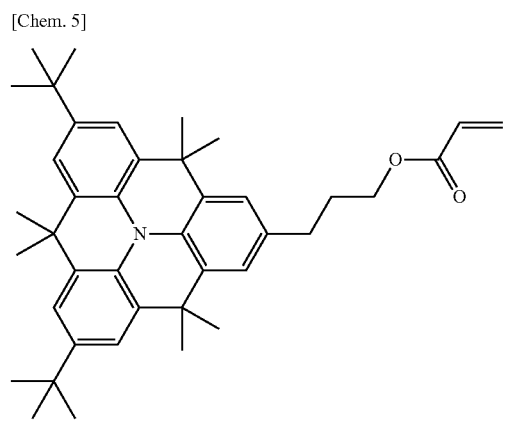

Example Compound 2

[Chem. 6]

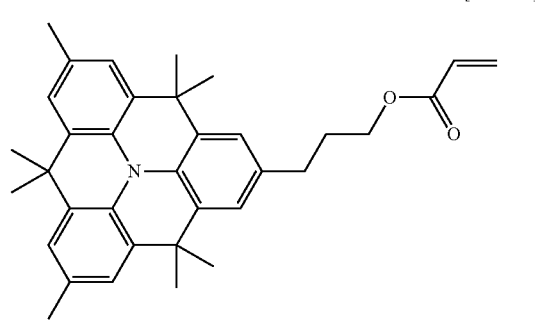

Example Compound 3
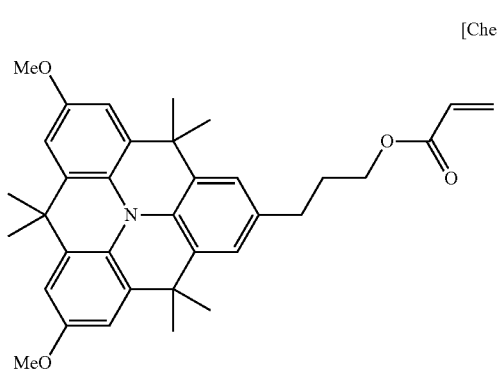
Example Compound 4
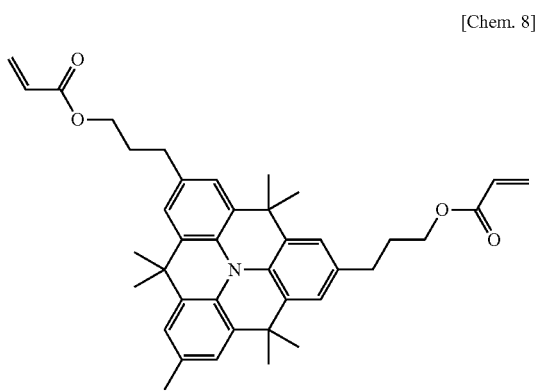 [SMILES: C=CC(=O)OCCCc1cc2c3c(c1)C(C)(C)c1cc(CCCOC(=O)C=C)cc4c1N3c1c(cc(C)cc1C4(C)C)C2(C)C]
Example Compound 5
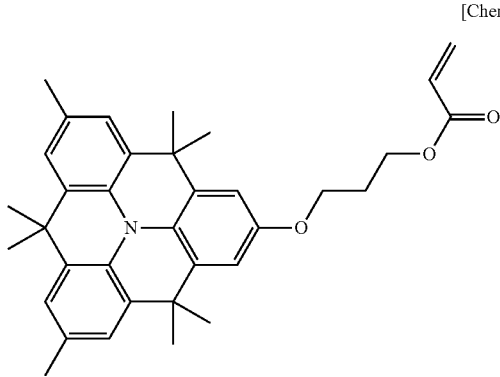
Example Compound 6
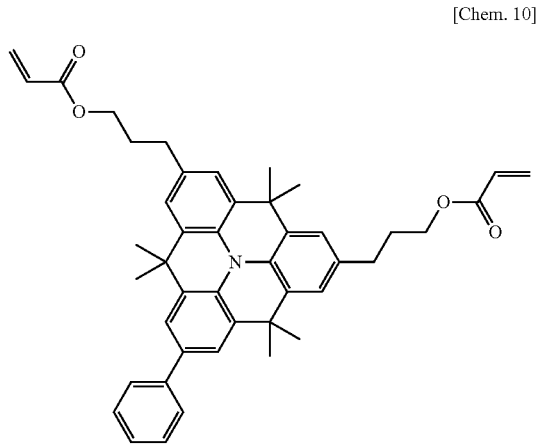 [SMILES: C=CC(=O)OCCCc1cc2c3c(c1)C(C)(C)c1cc(-c4ccccc4)cc4c1N3c1c(cc(CCCOC(=O)C=C)cc1C4(C)C)C2(C)C]
Example Compound 7
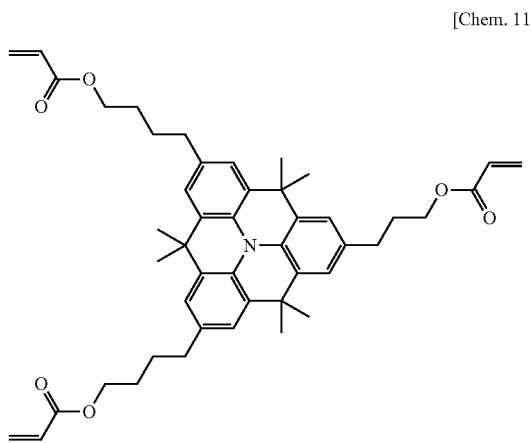
Example Compound 8
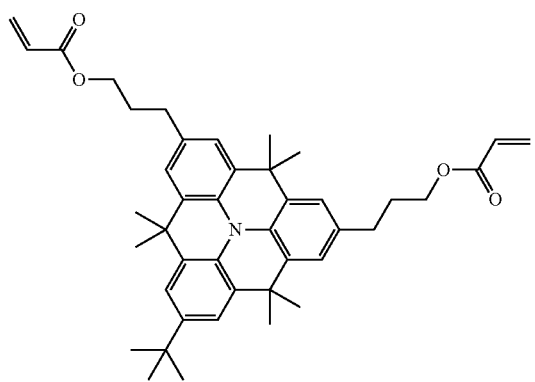

Example Compound 9
[Chem. 13]
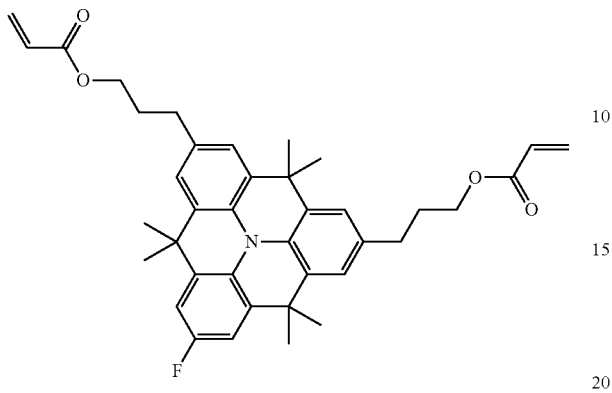
Example Compound 10
[Chem. 14]
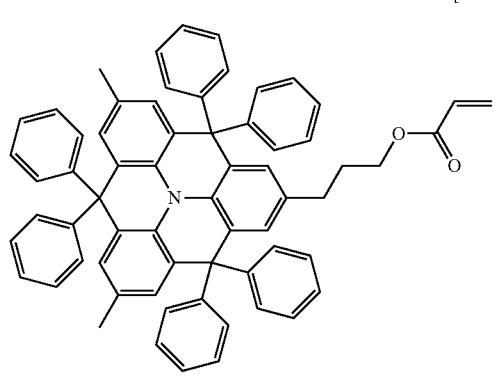
Example Compound 11
[Chem. 15]
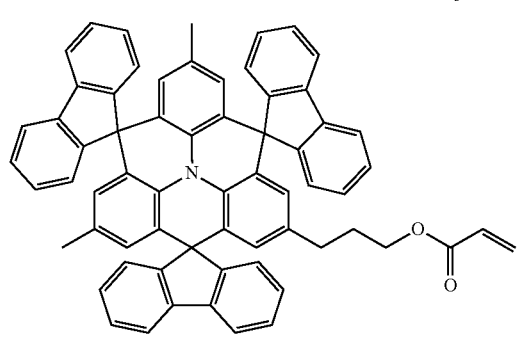
Example Compound 12
[Chem. 16]
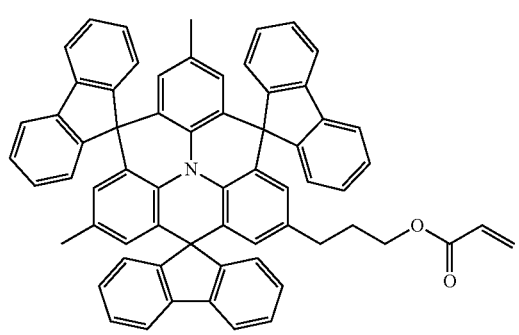
Example Compound 13
[Chem. 17]
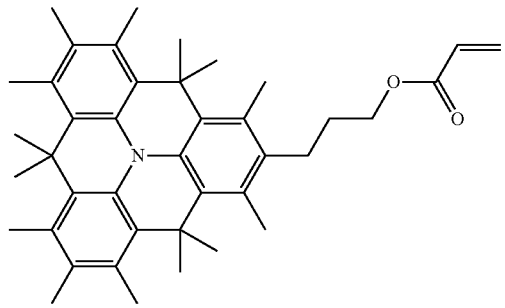
Example Compound 14
[Chem. 18]
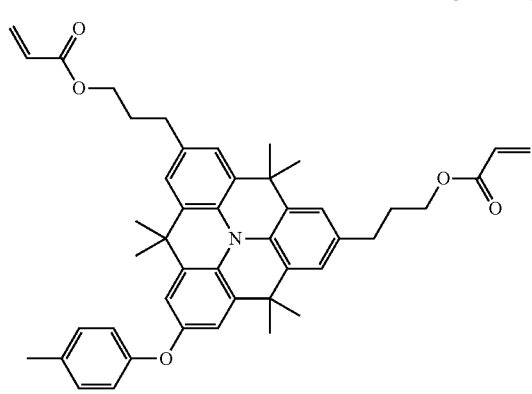

Example Compound 15
[Chem. 19]
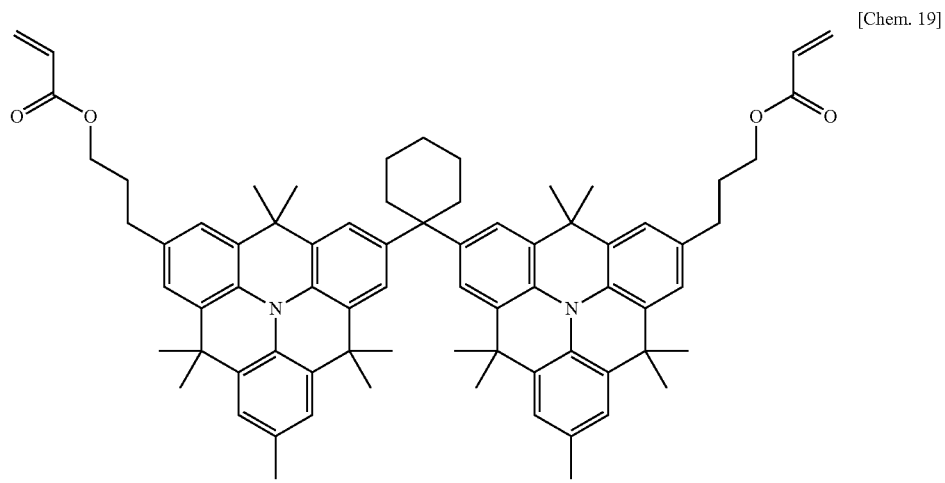 [SMILES: C=CC(=O)OCCCc1cc2c3c(c1)C(C)(C)c1cc(C4(c5cc6c7c(c5)C(C)(C)c5cc(CCCOC(=O)C=C)cc8c5N7c5c(cc(C)cc5C6(C)C)C8(C)C)CCCCC4)cc4c1N3c1c(cc(C)cc1C4(C)C)C2(C)C]
Example Compound 16
[Chem. 20]
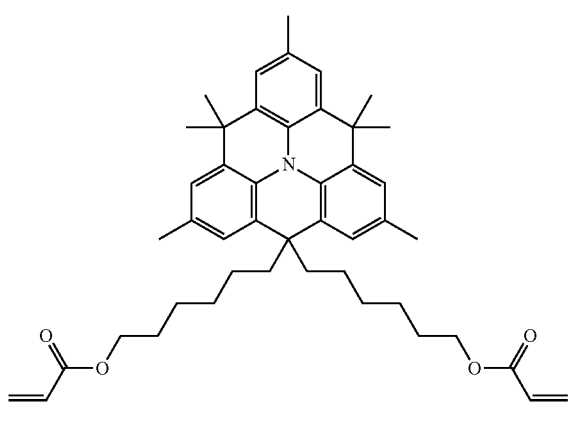
Example Compound 17
[Chem. 42]
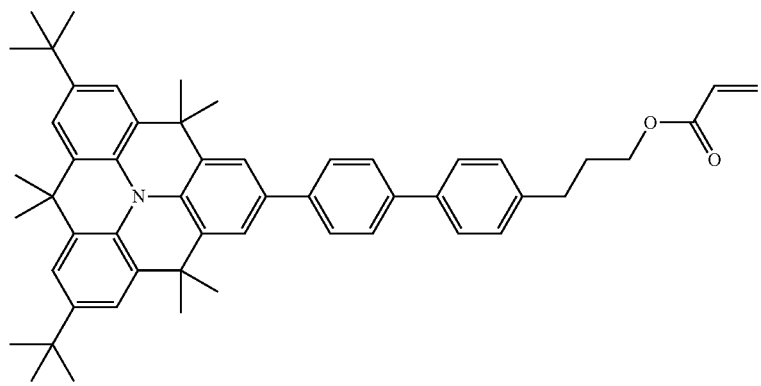

Example Compound 18
[Chem. 22]
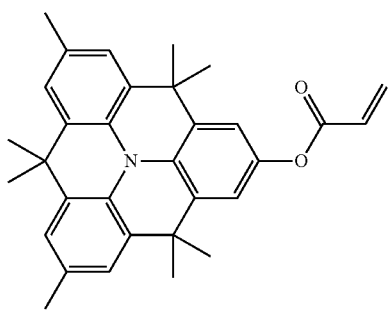
Example Compound 19
[Chem. 23]
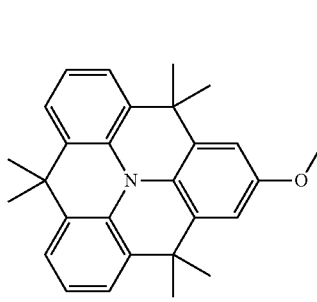
Example Compound 20
[Chem. 24]
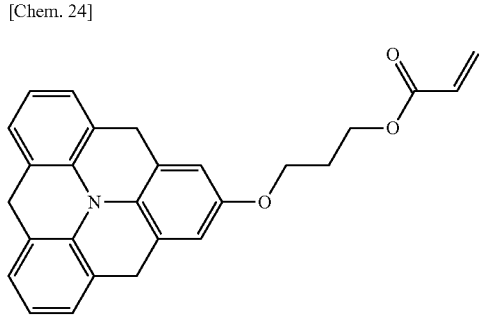 [SMILES: C=CC(=O)OCCCOc1cc2c3c(c1)Cc1cccc4c1N3c1c(cccc1C2)C4]
Example Compound 21
[Chem. 25]
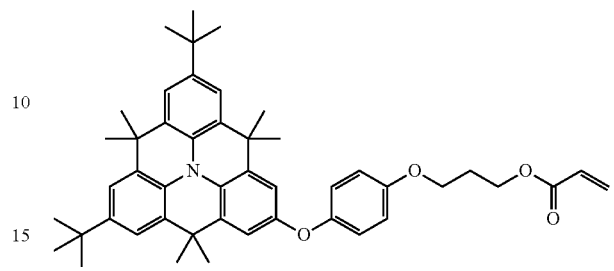
Example Compound 22
[Chem. 26]
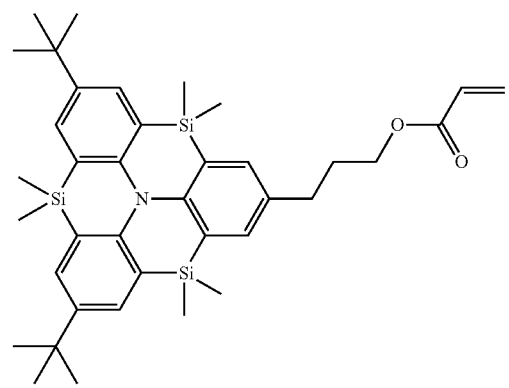
Example Compound 23
[Chem. 27]
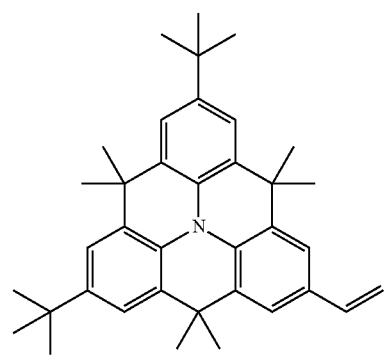

Example Compound M1
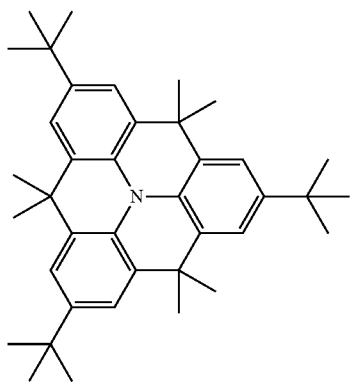
Example Compound M2
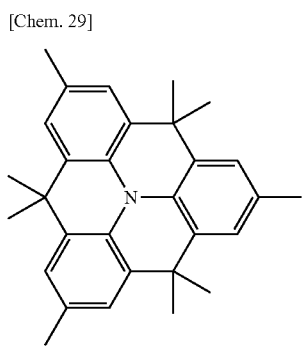
Example Compound M3
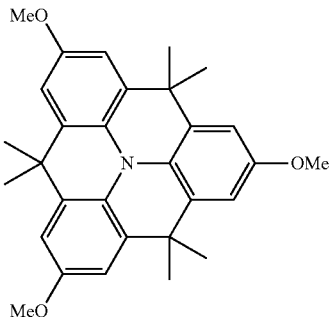
Example Compound M4
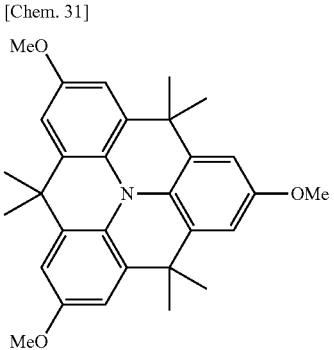
Example Compound M5
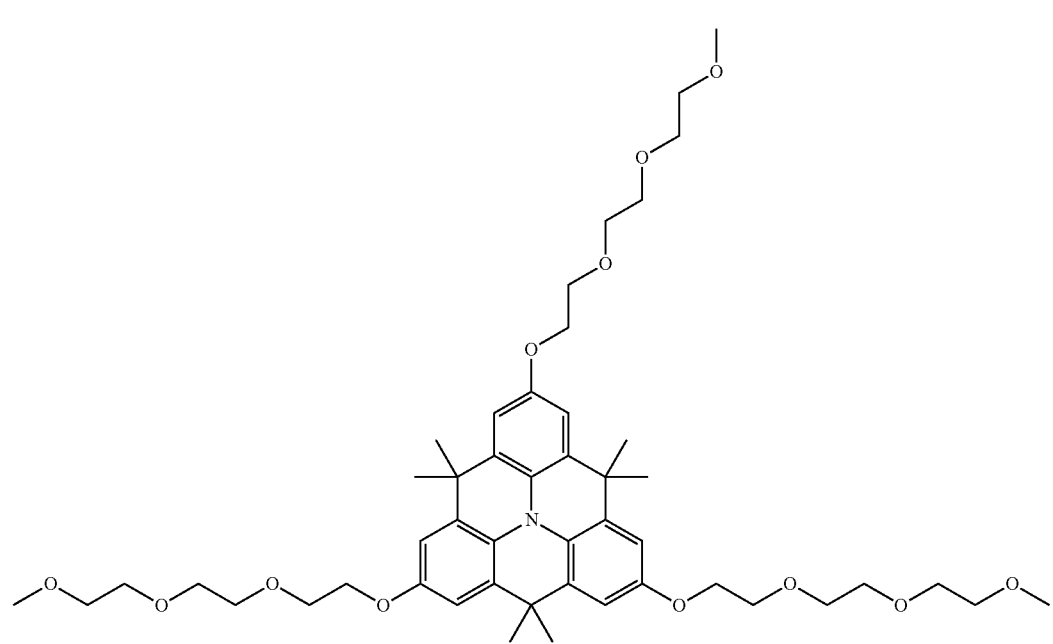

Example Compound M6
[Chem. 33]
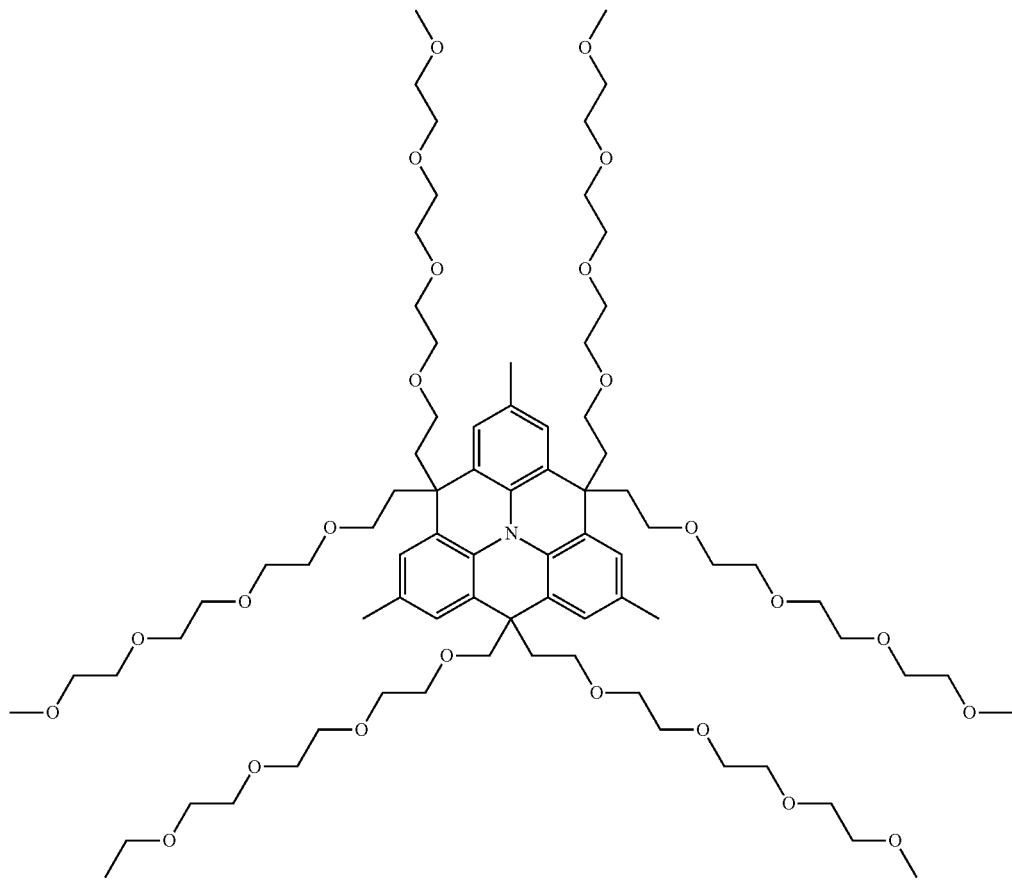
Example Compound M7
[Chem. 34]
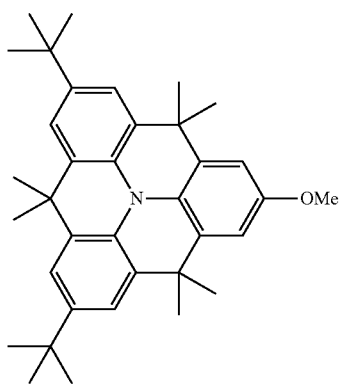
Example Compound M8
[Chem. 35]
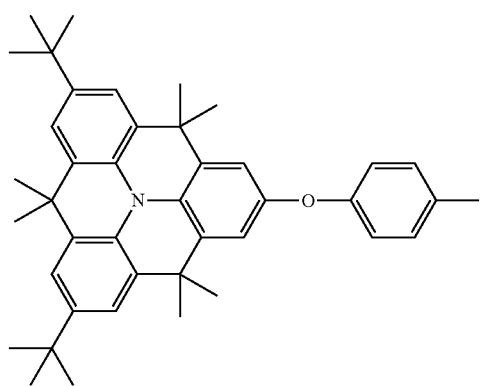

Example Compound M9

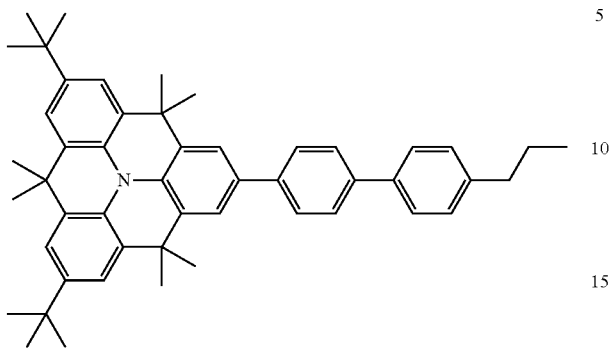

[Chem. 36]

Example Compound M10

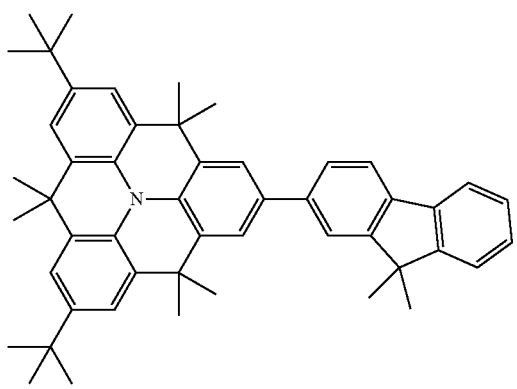

[Chem. 37]

Example Compound M11

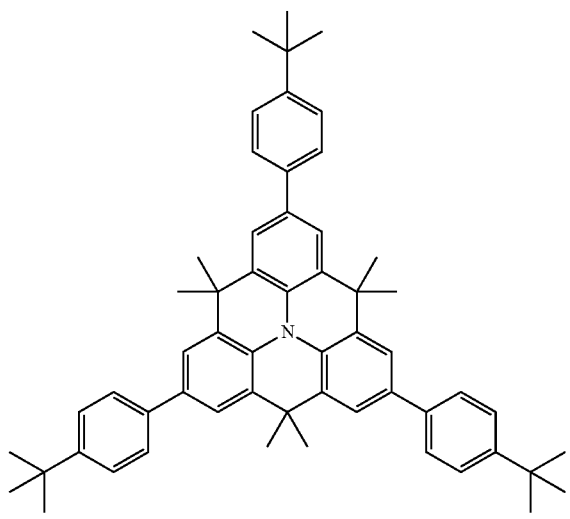

[Chem. 38]

Example Compound M12

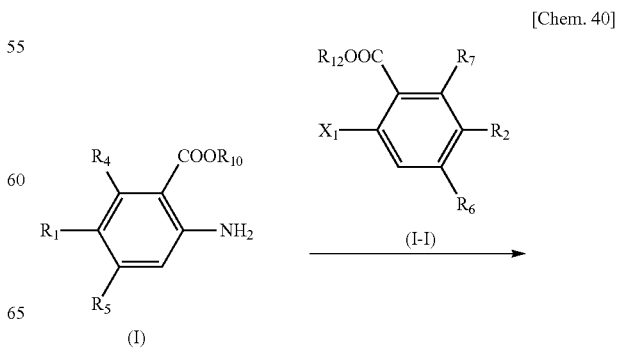

[Chem. 39]

The electrochromic compound according to the present embodiment is a radical-polymerizable compound having a triarylamine backbone, represented by the general formula (1) in which each of $X_1$ to $X_3$ and $R_1$ to $R_{15}$ represents a specific element or group. Accordingly, the electrochromic compound according to the present embodiment can improve light durability and durability against repetitive electrostatic charging/charge-removing processes similar to redox processes.

To be applied to electrochromic elements, the electrochromic compound is required to provide properties required by electrochromic elements. Electrochromic elements may require, for example, an electrochromic composition that is transparent in the neutral state, an electrochromic composition that has solubility, or electrochromic layers that are stackable. The electrochromic compound according to the present embodiment can provide such properties required by electrochromic elements.

Synthesis of Electrochromic Compound

The electrochromic compound according to the present embodiment can be efficiently synthesized by the following Synthesis Scheme Example 1 or Synthesis Scheme Example 2. The electrochromic compound according to the present embodiment can be synthesized by applying the method described in J. Mater. Chem., 22, 2017, 15397-15404 or Org. Lett., Vol. 11, No. 7, 2009.

Synthesis Scheme Example 1

[Chem. 40]

Synthesis Scheme Example 2

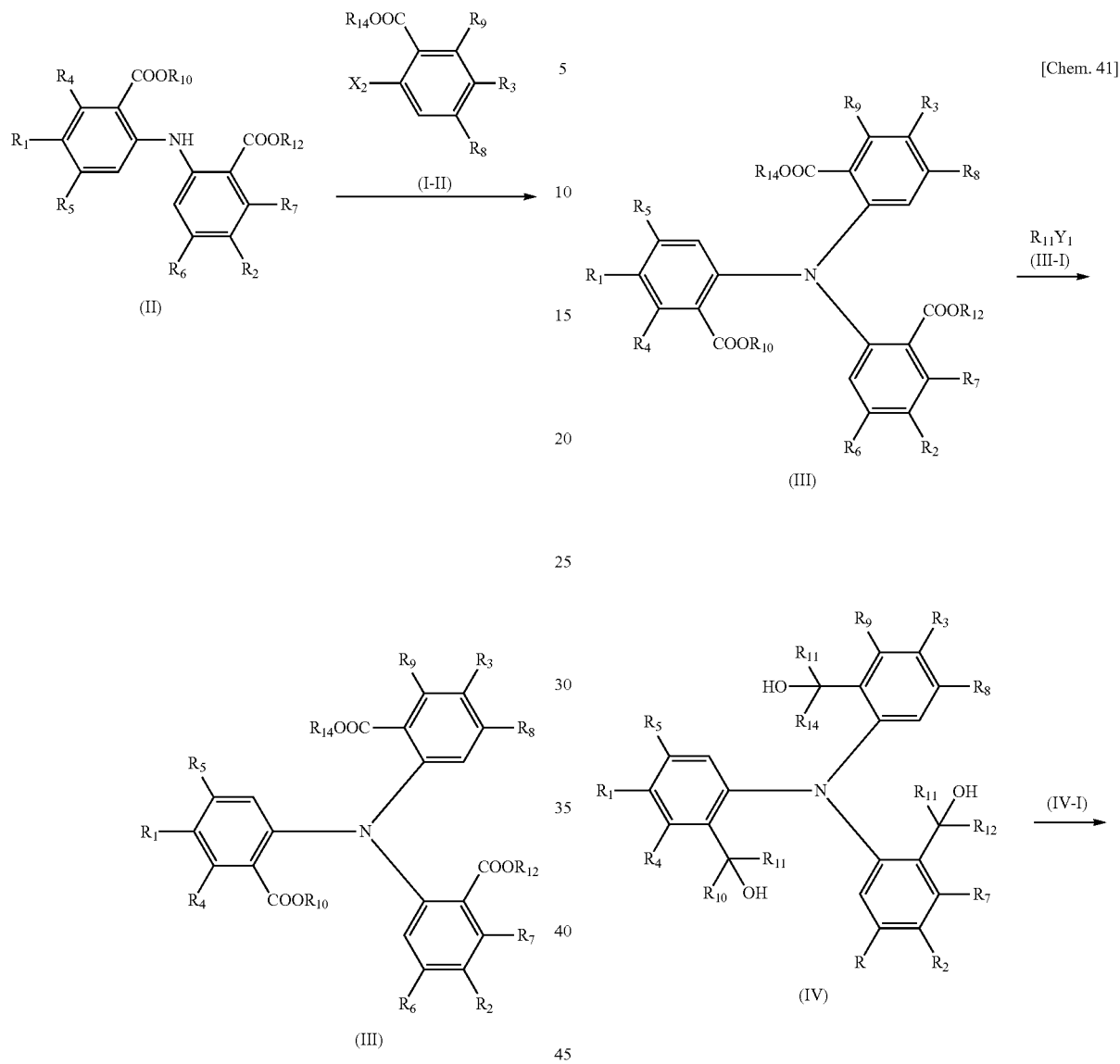

[Chem. 41]

A halogen or triflate compound (I-I) having an ester group on the ortho position is reacted with an aromatic amine compound (I) having an ester group on the ortho position. In the case of producing a symmetrical triphenylamine, the equivalent may be around 2. For this reaction, a carbon-nitrogen coupling reaction using an organometallic catalyst and a base can be employed, and name reactions such as the Ullman condensation and the Buchwald-Hartwig coupling can be employed. In the case of producing an asymmetric triphenylamine, a compound (I-II) is subsequently reacted under the same conditions as the compound (I-I), thus producing a triphenylamine derivative (III).

In the above scheme, each of $R_1$ to $R_{15}$ independently represents a hydrogen atom, a halogen atom, or a monovalent organic group. Each of $X_1$ and $X_2$ independently represents a halogen or a triflate group.

Subsequently, the triphenylamine derivative (III) is reacted with an organometallic compound (III-I). In this reaction, an organic lithium compound, a Grignard reagent, or an organic zinc compound can be suitably used. By this reaction, the ester is converted to a tertiary alcohol and a derivative (IV) is produced.

Subsequently, a reagent (IV-I) is added to the triphenylamine derivative (IV) to cause the intramolecular Friedel-Crafts reaction, thereby producing an electrochromic compound (V) according to the present embodiment by cyclodehydration. As the reagent (IV-I), an acid, such as 85% phosphoric acid, hydrochloric acid, acetic acid, trifluoroacetic acid, sulfuric acid, trifluoromethanesulfonic acid, hydrofluoric acid, polyphosphoric acid, and diphosphorus pentoxide, or a dehydrating agent can be suitably used. In addition, Lewis acids such as aluminum (III) chloride and fluoroboric acid can also be used.

When the para-position ($R_1$ to $R_3$ in the formula (V) in the above scheme) of the triphenylamine backbone is a hydrogen atom, halogenation can be performed with high efficiency by a conventionally known method. For example, a bromine atom can be introduced by equivalently reacting N-bromosuccinimide in chloroform. It is also possible to perform iodination by replacing with N-iodosuccinimide or the like. These halogen derivatives can be further derivatized by conventionally known coupling reactions (e.g., the Suzuki-Miyaura coupling with a boron derivative, the Stille-Migita-Kosugi coupling with an organotin compound, the Heck reaction with an alkene or an alkyne compound, and the Sonogashira coupling).

Electrochromic Composition

An electrochromic composition according to the present embodiment comprises the electrochromic compound according to the present embodiment.

The electrochromic compound according to the present embodiment is a radical-polymerizable compound having a triarylamine backbone. Therefore, the electrochromic compound has a role of imparting an electrochromic function for causing redox reactions at the surface of a first electrode of an electrochromic element according to the present embodiment to be described in detail later.

Preferably, the electrochromic composition according to the present embodiment further comprises a radical-polymerizable compound (hereinafter "the other radical-polymerizable compound") other than the electrochromic compound according to the present embodiment.

Benzidine Compound

The electrochromic composition according to the present embodiment may contain a benzidine compound as the other radical-polymerizable compound. Examples of the benzidine compound include a compound ("tetraphenyl benzidine compound") having a tetraphenyl benzidine backbone. By containing the tetraphenyl benzidine compound as the benzidine compound, the electrochromic composition according to the present embodiment is transparent in the neutral state and exhibits stable optical properties in the one-electron oxidation state, as described later.

In the tetraphenyl benzidine compound, preferably, the para-position of each of four phenyl groups substituted to the amino group of the benzidine backbone is substituted with a substituent other than hydrogen, such as an alkyl group, an alkoxy group, or a radical-polymerizable substituent. A benzidine compound having a terminal hydrogen may react and multimerize in the one-electron oxidation state. In the case of multimerization, there is a possibility that the color developed by the benzidine compound having a terminal hydrogen changes due to a change in oxidation potential or the like. In the tetraphenyl benzidine compound, when the para-position of each of four phenyl groups substituted to the amino group of the benzidine backbone is substituted with a substituent other than hydrogen, electrochemical stability is improved. Thus, multimerization of the tetraphenyl benzidine compound in the one-electron oxidation state can be prevented, so that stable optical properties are exhibited by, for example, preventing a hue change in the developed color.

The tetraphenyl benzidine compound can be used as it is or after being copolymerized. Therefore, the tetraphenyl benzidine compound may have a radical-polymerizable substituent. The radical-polymerizable substituent can be appropriately modified within the same scope as the compound of the present application, and may be present at a part of the tetraphenyl benzidine compound such as at a terminal of the alkyl group or alkoxy group at the para position. Particularly preferred are acryloyloxy group and methacryloyloxy group.

Preferably, the tetraphenyl benzidine compound in the neutral state is transparent in the visible range, that is, the absorption edge of the UV-visible absorption spectrum is 430 nm or less, more preferably 420 nm or less, and most preferably 410 nm or less. In addition, preferably, the tetraphenyl benzidine compound is colored in yellow or orange upon one-electron oxidation, the peak wavelength in the visible range (from 380 to 780 nm) is around 450 to 550 nm, and the absorption edge is in the range of from 550 to 650 nm. By combining such a tetraphenyl benzidine compound with the electrochromic compound of the present embodiment colored in blue, black color can be developed because their absorption characteristic in the visible region are complementary.

Specific examples of the tetraphenyl benzidine compound satisfying the above-described optical properties include the following Example Compounds, but are not limited thereto.

Example Compound B1

[Chem. 42]

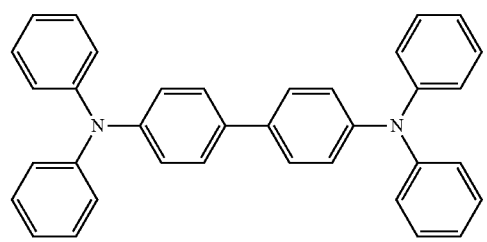

Example Compound B2
[Chem. 43]
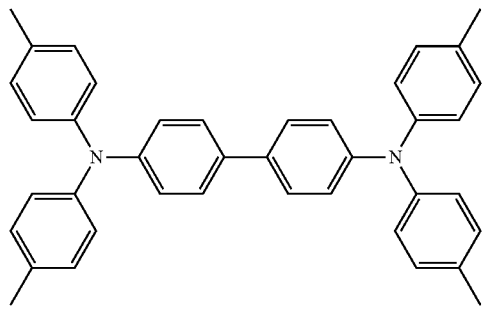
Example Compound B3
[Chem. 44]
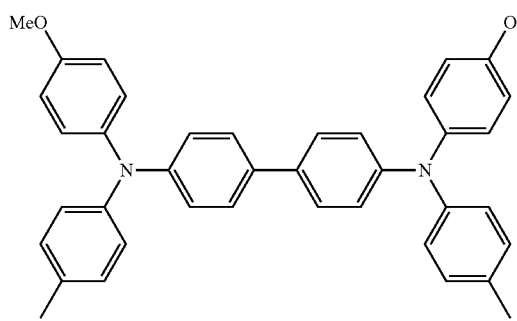
Example Compound B4
[Chem. 45]
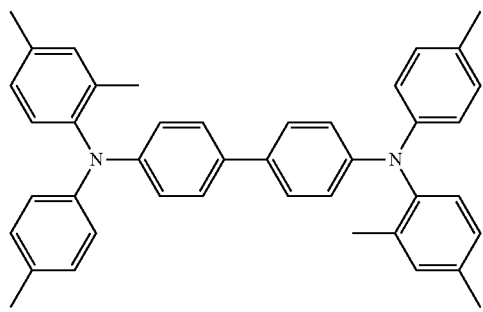
Example Compound B5
[Chem. 46]
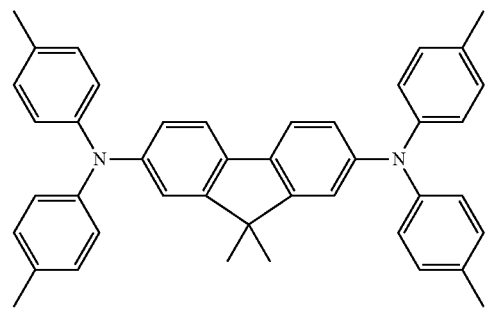
Example Compound B6
[Chem. 47]
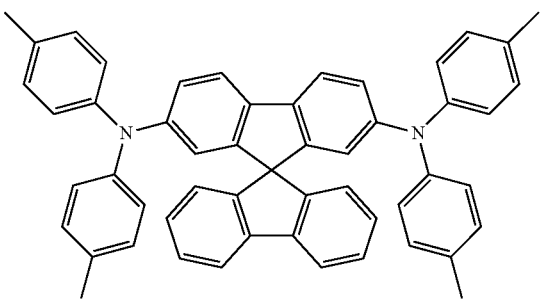
Example Compound B7
[Chem. 48]
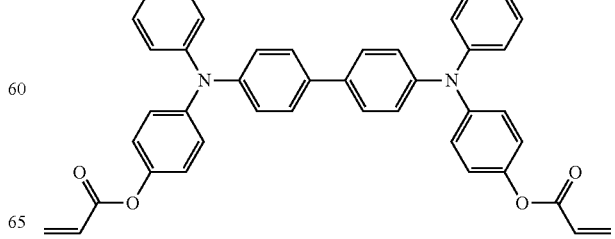

Example Compound B8
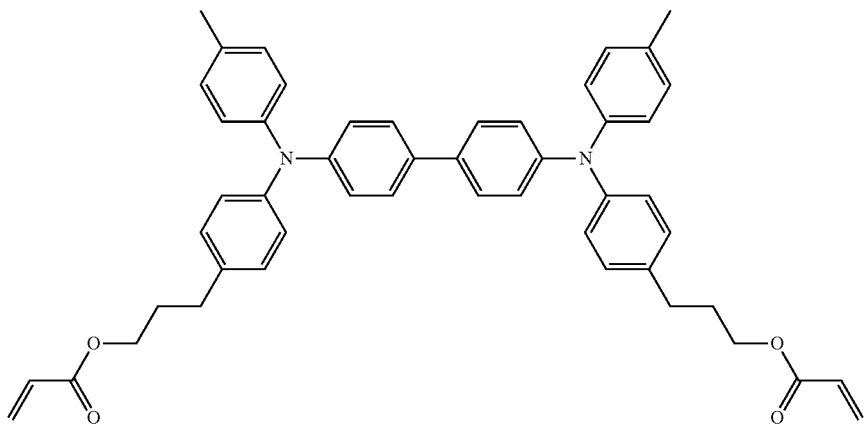
[Chem. 49]
Example Compound B9
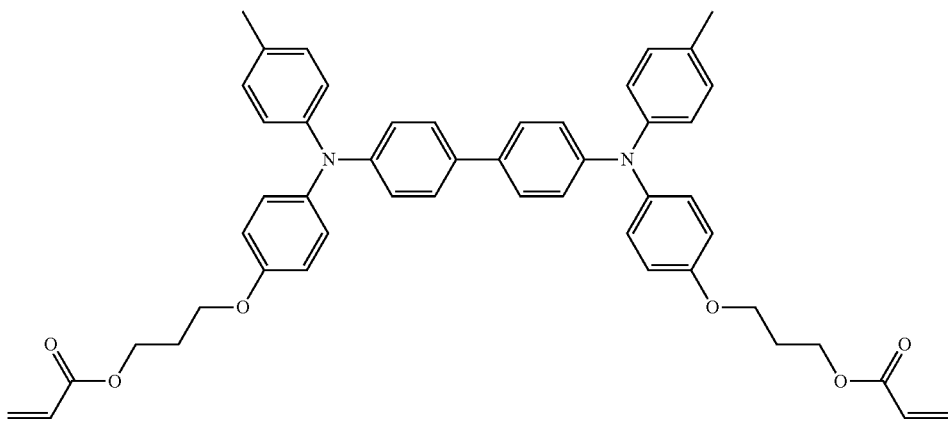
[Chem. 50]
Example Compound B10
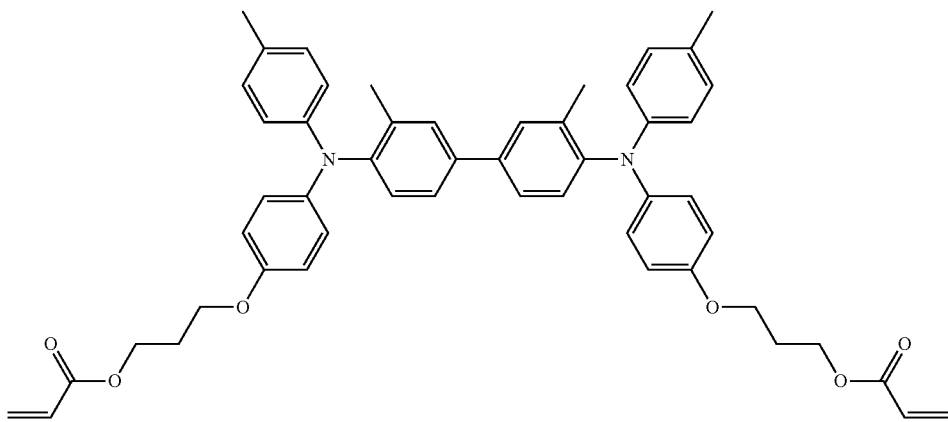
[Chem. 51]

Example Compound B11
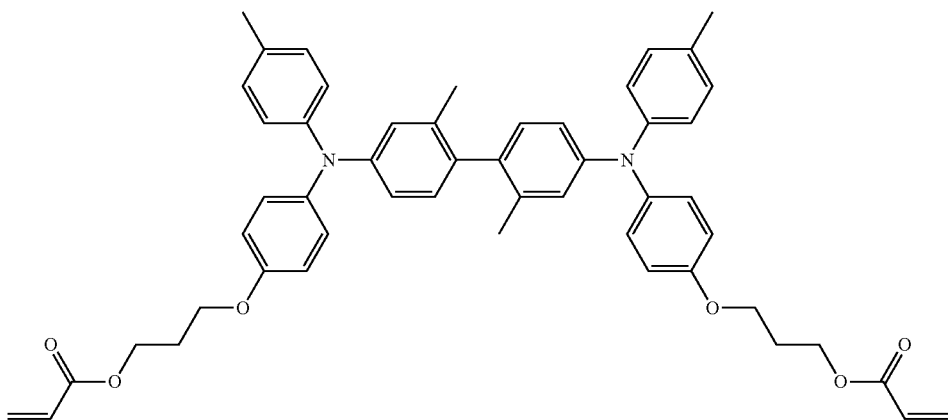
Example Compound B12
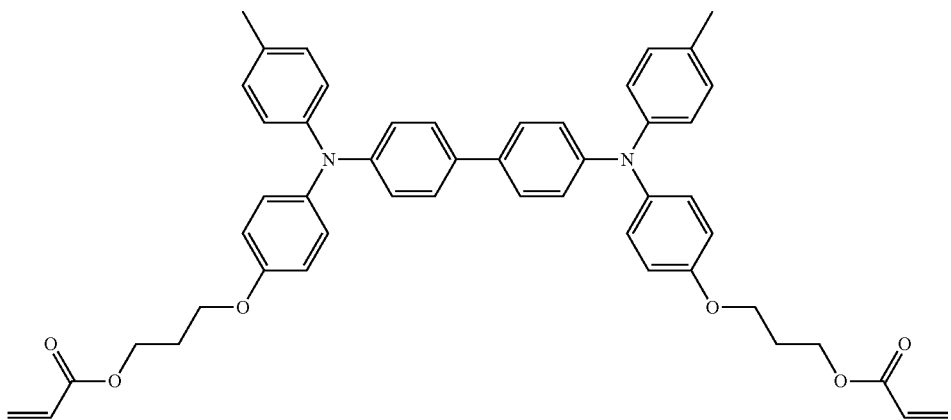
Example Compound B13
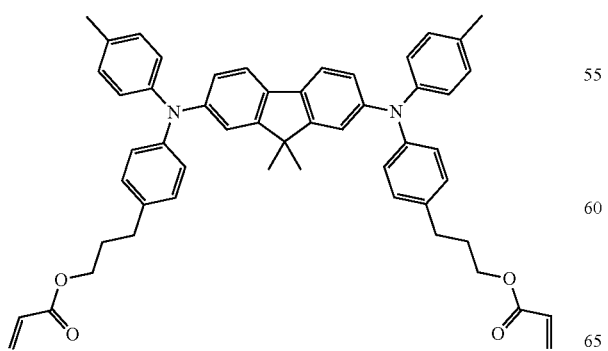

Example Compound B14

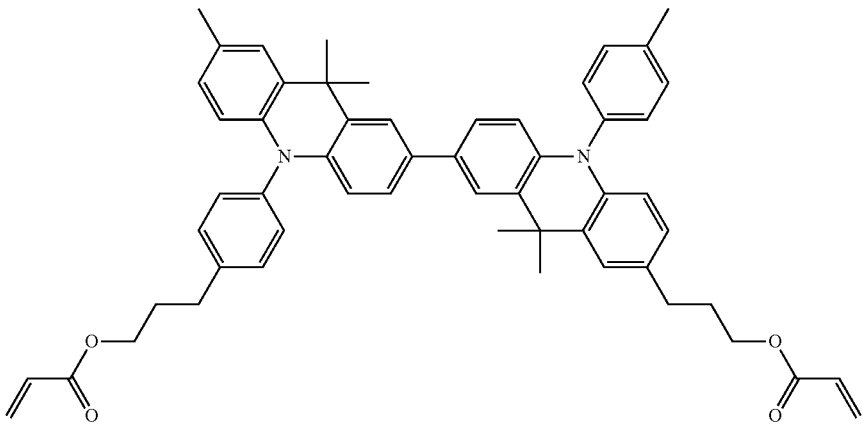

[Chem. 55]

Example Compound B15

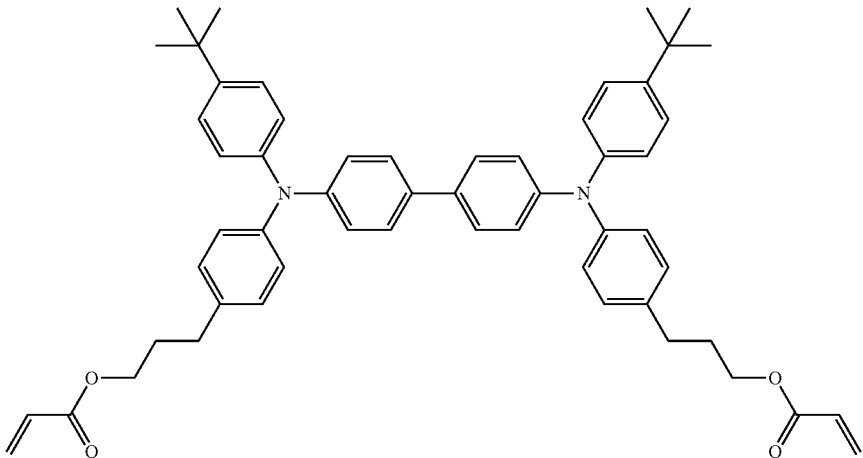

[Chem. 56]

Other Radical-Polymerizable Compound

The other radical-polymerizable compound is a compound having at least one radical-polymerizable functional group, and is different from the electrochromic compound according to the present embodiment. A plurality of compounds having a triphenylamine backbone or a benzidine backbone can be used.

Examples of the other radical-polymerizable compound include, but are not limited to, monofunctional radical-polymerizable compounds, difunctional radical-polymerizable compounds, trifunctional or higher radical-polymerizable compounds, functional monomers, and radical-polymerizable oligomers. Among these compounds, difunctional or higher radical-polymerizable compounds are preferable. The radical-polymerizable functional group in the other radical-polymerizable compound is the same as the radical-polymerizable functional group in the electrochromic compound according to the present embodiment. Among them, acryloyloxy group and methacryloyloxy group are particularly preferable.

Specific examples of the monofunctional radical-polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these members can be used alone or in combination with others.

Specific examples of the difunctional radical-polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. Each of these members can be used alone or in combination with others.

Specific examples of the trifunctional radical-polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris (acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these members can be used alone or in combination with others. In the above descriptions, "EO-modified" and "PO-modified" represent "ethyleneoxy-modified" and "propyleneoxy-modified", respectively.

Specific examples of the functional monomers include, but are not limited to: fluorine-substituted monomers, such as octafluoropentyl acrylate, 2-perfluorooctylethyl acrylate, 2-perfluorooctylethyl methacrylate, and 2-perfluoroisononylethyl acrylate; polysiloxane-group-containing vinyl monomers having 20 to 70 siloxane repeating units disclosed in JP-05-60503-B and JP-06-45770-B, such as acryloyl polydimethylsiloxane ethyl, methacryloyl polydimethylsiloxane ethyl, acryloyl polydimethylsiloxane propyl, acryloyl polydimethylsiloxane butyl, and diacryloyl polydimethylsiloxane diethyl; and acrylates and methacrylates. Each of these members can be used alone or in combination with others.

Specific examples of the radical-polymerizable oligomers include, but are not limited to, epoxy acrylate oligomers, urethane acrylate oligomers, and polyester acrylate oligomers.

The electrochromic compound according to the present embodiment and the other radical-polymerizable compound can be copolymerized by a polymerization reaction. Preferably, at least one of the electrochromic compound and the other radical-polymerizable compound has two or more radical-polymerizable functional groups, for forming a polymer or cross-linked product. The polymer or cross-linked product is preferable for its mechanical strength, poor solubility in various organic solvents and electrolytes, and little migration between layers in forming a multilayer structure.

Preferably, the proportion of the electrochromic compound in the electrochromic composition is from 10% to 100% by mass, more preferably from 30% to 90% by mass. When the proportion is 10% by mass or more, the first electrochromic layer in the electrochromic element, to be described later, sufficiently exhibits an electrochromic function, durability against repeated use under application of voltage is good, and color developing sensitivity is good. When the proportion is 100% by mass or less, the first electrochromic layer exhibits an electrochromic function, and color developing sensitivity is sufficiently high for the thickness. When the proportion is 100% by mass, there may be a case in which the electrochromic composition becomes less compatible with an ionic liquid that is needed for giving and receiving charge, thereby causing deterioration of electric properties by, for example, deterioration of durability against repeated use under application of voltage. Although it depends on the process with which the electrochromic composition is to be used, a preferred proportion is in the range of from 30% to 90% by mass for achieving a good balance between color developing sensitivity and durability against repeated use.

Preferably, the electrochromic composition further contains a filler and/or a polymerization initiator.

Filler

The filler is not particularly limited and can be appropriately selected according to the purpose. Examples thereof include, but are not limited to, inorganic fillers and organic fillers.

Specific examples of the inorganic fillers include, but are not limited to, powders of metals (e.g., copper, tin, aluminum, indium), metal oxides (e.g., silicon oxide (silica), tin oxide, zinc oxide, titanium oxide, aluminum oxide (alumina), zirconium oxide, indium oxide, antimony oxide, bismuth oxide, calcium oxide, antimony-doped tin oxide (ATO), tin-doped indium oxide), and metal fluorides (e.g., tin fluoride, calcium fluoride, and aluminum fluoride). Each of these materials can be used alone or in combination with others. Among these, metal oxides are preferable, and silica, alumina, and antimony-doped tin oxide (ATO) are more preferable, for transparency, stability, and the ease in surface modification.

Specific examples of the organic fillers include, but are not limited to, resins (e.g., polyester, polyether, polysulfide, polyolefin, silicone, polytetrafluoroethylene), low-molecular-weight compounds (e.g., fatty acids), and pigments (e.g., phthalocyanine). Each of these materials can be used alone or in combination with others. Among these materials, resins are preferable for transparency and insolubility. Preferably, the filler has an average primary particle diameter of 1 μm or less, more preferably from 10 nm to 1 μm. When the average primary particle diameter of the filler is 1 μm or less, the resulting layer has excellent surface smoothness since no coarse particle is present.

Preferably, the amount of the filler is from 0.3 to 1.5 parts by mass, more preferably from 0.6 to 0.9 parts by mass, with respect to 100 parts by mass of the total radical-polymerizable compounds on solid basis. When the amount is 0.3 parts by mass or more, the effect of addition of filler is sufficiently exerted and film formation property is excellent. When the amount is 1.5 parts by mass of less, the proportion of triarylamine compounds is appropriate and electrochemical properties of the resulting electrochromic element are excellent.

Polymerization Initiator

Preferably, the electrochromic composition according to the present embodiment contains a polymerization initiator, as necessary, for improving a cross-linking reaction efficiency between the electrochromic compound and the other radical-polymerizable compound. Examples of the polymerization initiator include, but are not limited to, thermal polymerization initiators and photopolymerization initiators. Photopolymerization initiators are more preferable for polymerization efficiency.

The thermal polymerization initiator is not particularly limited and may be appropriately selected depending on the purpose. Specific examples of the thermal polymerization initiators include, but are not limited to: peroxide initiators such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexine-3, di-t-butyl peroxide, t-butyl hydroperoxide, cumene hydroperoxide, and lauroyl peroxide; and azo initiators such as azobisisobutyronitrile, azobiscyclohexanecarbonitrile, azobis(methyl isobutyrate), azobisisobutyl amidine hydrochloride, and 4,4'-azobis-4-cyanovaleric acid. Each of these materials can be used alone or in combination with others.

The photopolymerization initiator is not particularly limited and may be appropriately selected depending on the purpose. Specific examples of the photopolymerization initiators include, but are not limited to: acetophenone or ketal photopolymerization initiators such as diethoxyacetophenone, 2,2-dimethoxy-1,2-diphenylethane-1-one, 1-hydroxycyclohexyl-phenyl-ketone, 4-(2-hydroxyethoxy)phenyl-(2-hydroxy-2-propyl) ketone, 2-benzyl-2-dimethylamino-1-(4-morpholinophenyl)butanone-1,2-hydroxy-2-methyl-1-phenylpropane-1-one, 2-methyl-2-morpholino(4-methylthiophenyl)propane-1-one, and 1-phenyl-1,2-propanedione-2-(o-ethoxycarbonyl)oxime; benzoin ether photopolymerization initiators such as benzoin, benzoin methyl ether, benzoin ethyl ether, benzoin isobutyl ether, and benzoin isopropyl ether; benzophenone photopolymerization initiators such as benzophenone, 4-hydroxybenzophenone, methyl o-benzoylbenzoate, 2-benzoyl naphthalene, 4-benzoyl biphenyl, 4-benzoyl phenyl ether, acrylated benzophenone, and 1,4-benzoyl benzene; and thioxanthone photopolymerization initiators such as 2-isopropyl thioxanthone, 2-chlorothioxanthone, 2,4-dimethylthioxanthone, 2,4-diethylthioxanthone, and 2,4-dichlorothioxanthone.

Specific examples of the photopolymerization initiators further include, but are not limited to, ethylanthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, and imidazole compounds. Each of these materials can be used alone or in combination with others.

In addition, a photopolymerization accelerator may be used alone or in combination with the photopolymerization initiator. Specific examples of the photopolymerization accelerator include, but are not limited to, triethanolamine, methyldimethanolamine, ethyl 4-dimethylaminobenzoate, isoamyl 4-dimethylaminobenzoate, (2-dimethylamino)ethyl benzoate, and 4,4'-dimethylaminobenzophenone.

Preferably, the amount of the polymerization initiator is from 0.5 to 40 parts by mass, more preferably from 1 to 20 parts by mass, with respect to 100 parts by mass of the total radical-polymerizable compounds.

Other Components

The electrochromic composition according to the present embodiment may further contain other components, as necessary. Examples of the other components include, but are not limited to, a solvent, a plasticizer, a leveling agent, a sensitizer, a dispersant, a surfactant, and an antioxidant.

In addition, the electrochromic composition according to the present embodiment may contain a cross-linking agent, and may be a copolymer (e.g., a linear copolymer having a linear structure) in which the electrochromic compound according to the present embodiment is polymerized. In addition, the electrochromic composition according to the present embodiment may be a cross-linked product having a branched structure or a three-dimensional network structure, in which the electrochromic compound according to the present embodiment is cross-linked. The cross-linking agent is not particularly limited and can be appropriately selected according to the purpose. Specific examples thereof include, but are not limited to, isocyanates, amino resins, phenol resins, amines, epoxy compounds, monofunctional acrylates and methacrylates, polyfunctional acrylates and methacrylates having at least two ethylenic unsaturated bonds per molecule, and acrylic acid esters and methacrylic acid esters. Among these compounds, isocyanates are preferable, and polyisocyanates having multiple isocyanate groups are particularly preferable.

The electrochromic composition according to the present embodiment is able to provide properties required by electrochromic elements because the electrochromic compound according to the present embodiment is contained therein. Electrochromic elements may require, for example, an electrochromic composition that is transparent in the neutral state and has solubility and electrochromic layers that are stackable, as described above.

Electrochromic Element

An electrochromic element according to the present embodiment includes a first electrode, a second electrode, and an electrolyte layer disposed between the first electrode and the second electrode. The electrochromic element may further include other members, as necessary. The electrochromic element according to the present embodiment further includes, on the first electrode, an electrochromic layer containing the electrochromic composition according to the present embodiment. Alternatively, the electrolyte layer contains the electrochromic composition according to the present embodiment.

The electrochromic composition according to the present embodiment has excellent light durability and repetition durability, and can meet the properties required by electrochromic elements. Therefore, the electrochromic element according to the present embodiment uses the electrochromic composition according to the present embodiment under optimum configuration and position. As a result, the electrochromic element according to the present embodiment can provide superior effects than conventional electrochromic elements, in particular, excellent repetition durability and light durability.

In the following description, an electrochromic element which contains the electrochromic composition according to the present embodiment in an electrochromic layer disposed on the first electrode is referred to as the electrochromic element according to the first embodiment. In addition, an electrochromic element which contains the electrochromic composition according to the present embodiment in an electrolyte layer is referred to as the electrochromic element according to the second embodiment. Hereinafter, the electrochromic element according to each embodiment is described in detail.

Electrochromic Element according to First Embodiment

The electrochromic element according to the first embodiment is described in detail below. In the drawings, the scale of each member may be different from the actual scale, for ease of understanding. For the sake of convenience, explanation of a layer structure will be given with the drawings in which a first substrate is illustrated on the lower side, but the arrangement of the layers is not limited thereto in the actual manufacture or use. In the following descriptions, one side of the first substrate in the thickness direction may be referred to as "upper side", and the other side may be referred to as "lower side".

FIG. 1 is a schematic cross-sectional view of the electrochromic element according to the first embodiment. Referring to FIG. 1, an electrochromic element 10A comprises a first substrate 11, a display electrode ("first electrode") 12, a first electrochromic layer 13, an electrolyte layer 14A, a second electrochromic layer 15, a counter electrode ("second electrode") 16, and a second substrate 17. These members are stacked in this order from the first substrate 11 side.

The display electrode 12 is disposed on the upper side of the first substrate 11, and the first electrochromic layer 13 is disposed on the upper side of the display electrode 12. The counter electrode 16 is disposed on the lower side of the second substrate 17, and the second electrochromic layer 15 is disposed on the lower side of the counter electrode 16. The display electrode 12 and the counter electrode 16 are facing each other with a gap therebetween. The electrolyte layer 14A is disposed between the display electrode 12 and the counter electrode 16.

In the electrochromic element 10A, the first electrochromic layer 13 is colored or decolored in response to a redox reaction occurring at the surface of the display electrode 12, and the second electrochromic layer 15 is colored or decolored in response to a redox reaction occurring at the surface of the counter electrode 16.

The members constituting the electrochromic element 10A are each described in detail below.

First Electrochromic Layer

The first electrochromic layer contains the above-described electrochromic composition according to the present embodiment. The electrochromic composition used in the first embodiment is hereinafter referred to as the "first electrochromic composition" to be distinguished from the "second electrochromic composition" used in the second embodiment.

The first electrochromic composition preferably contains the electrochromic compound according to the present embodiment and the other radical-polymerizable compound, as described above, for solubility and durability of the polymerized product of the first electrochromic composition.

The first electrochromic layer may be stacked on the first electrode either in a single layer or in multiple layers.

The first electrochromic layer may be stacked on either the whole surface of the first electrode or a partial surface of the first electrode.

The first electrochromic layer can be formed by a method for producing an electrochromic element to be described later. Preferably, the first electrochromic layer has an average thickness of from 0.1 to 30 µm, more preferably from 0.4 to 10 µm.

First Electrode and Second Electrode

The material of the first electrode and the second electrode is not particularly limited and can be appropriately selected depending on the purpose as long as it is a transparent material having conductivity. Specific examples of the material of the first electrode and the second electrode include, but are not limited to, inorganic materials such as tin-doped indium oxide (ITO), fluorine-doped tin oxide (FTO), antimony-doped tin oxide (ATO), and zinc oxide. Among these, InSnO, GaZnO, SnO, $In_2O_3$, and ZnO are preferable.

Alternatively, a carbon nanotube having transparency, or an electrode made of a highly-conductive non-transmissive material such as Au, Ag, Pt, and Cu formed into a fine network structure to improve conductivity while maintaining transparency, may be used.

The thicknesses of the first electrode and the second electrode are so adjusted that these electrodes have proper electric resistance values required for causing redox reactions in the first electrochromic layer and the second electrochromic layer. In a case in which the material of the first electrode and the second electrode is ITO, the thickness of each of the first electrode and the second electrode is preferably from 50 to 500 nm.

The first electrode and the second electrode may be formed by, for example, vacuum vapor deposition, sputtering, or ion plating. In addition, the first electrode and the second electrode can also be formed by any coating method, such as spin coating, casting, micro gravure coating, gravure coating, bar coating, roll coating, wire bar coating, dip coating, slit coating, capillary coating, spray coating, nozzle coating, or various printing methods, such as gravure printing, screen printing, flexo printing, offset printing, reverse printing, and inkjet printing.

Electrolyte Layer

The electrolyte layer is formed of an electrolyte filling the gap between the first electrode and the second electrode. The electrolyte may be injected into the gap between the first electrode and the second electrode through multiple injection holes formed on a sealing material disposed between the first electrode and the second electrode, thereby filling the gap between the first electrode and the second electrode.

Examples of the electrolyte include, but are not limited to, inorganic ion salts (e.g., alkali metal salts and alkali-earth metal salts), quaternary ammonium salts, and supporting salts of acids and bases. Specific examples thereof include, but are not limited to, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

In addition, ionic liquids can also be used as the electrolyte. In particular, organic ionic liquids are preferable because they have a molecular structure that exhibits liquidity in a wide temperature range including room temperature. Specific examples of cationic components in such organic ionic liquids include, but are not limited to, imidazole derivatives (e.g., N,N-dimethylimidazole salt, N,N-methylethylimidazole salt, and N,N-methylpropylimidazole salt), pyridinium derivatives (e.g., N,N-dimethylpyridinium salt and N,N-methylpropylpyridinium salt), and aliphatic quaternary ammonium salts (e.g., trimethylpropylammonium salt, trimethylhexylammonium salt, and triethylhexylammonium salt). Specific preferred examples of anionic components therein include, but are not limited to, fluorine-containing compounds such as $BF_4^-$, $CF_3SO_3^-$, $PF_4^-$, $(CF_3SO_2)_2N^-$, and tetracyanobome anion $(B(CN)_4^-)$, for stability in the atmosphere.

Ionic liquids in which the cationic and anionic components are combined are preferably used as the electrolyte. The ionic liquid may be directly dissolved in a photopolymerizable monomer, an oligomer, or a liquid crystal material. When solubility is poor, the ionic liquid may be first dissolved in a small amount of a solvent, and thereafter mixed with a photopolymerizable monomer, an oligomer, or a liquid crystal material. Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

The electrolyte needs not necessarily be a low-viscosity liquid and may be in the form of a gel, cross-linked polymer, or liquid crystal dispersion. The electrolyte in the form of a gel or solid is advantageous for improving strength and reliability of the element. Preferably, the electrolyte and the solvent are held in a polymer resin for reliable fixation. By this configuration, high ion conductivity and solid strength can be achieved. Preferably, the polymer resin is a photo-curable resin. This is because electrochromic element can be prepared at a lower temperature and within a shorter time period compared to a case in which a thin layer is formed by thermal polymerization and/or solvent evaporation. The average thickness of the electrolyte layer containing the electrolyte is not particularly limited and can be appropriately selected according to the purpose, but is preferably from 100 nm to 10 μm.

Second Electrochromic Layer

The second electrochromic layer may be stacked on the lower surface of the second electrode in a single layer or in multiple layers. The second electrochromic layer may be stacked on either the whole surface of the lower surface of the second electrode or a partial surface of the lower surface of the second electrode.

The second electrochromic layer may contain a second electrochromic compound that is a viologen compound represented by the following general formula (I). More specifically, the second electrochromic layer contains an electrochromic complex comprising the viologen compound represented by the general formula (I) in a conductive nanostructural body or a semiconductive nanostructural body (hereinafter "conductive or semiconductive nanostructural body"). The viologen compound represented by the general formula (I) is bindable or adsorbable to the conductive or semiconductive nanostructural body. The electrochromic complex contained in the electrochromic element develops blue color and provides excellent image memory property, i.e., color image maintainability.

General Formula (I)

[Chem. 57]

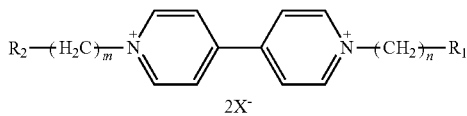

The second electrochromic layer may further contain, other than the viologen compound represented by the general formula (I), a phosphonic acid compound represented by the following general formula (II) described in JP-2017-111434-A or a straight-chain alkyl phosphonic acid alone or coadsorbed with the viologen compound.

General Formula (II)

[Chem. 58]

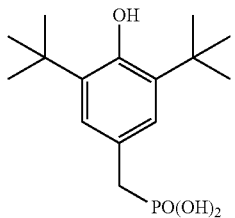

Viologen Compound

The viologen compound represented by the general formula (I) is described in detail below.

In the formula (I), each of $R_1$ and $R_2$ independently represents a hydrogen atom, an aryl group having 14 carbon atoms at most, a heteroaryl group, a branched alkyl group having 10 carbon atoms at most, an alkenyl group, a cycloalkyl group, or a functional group bindable to hydroxyl group. E of n and m independently represents 0 or an integer of from 1 to 10. $X^-$ represents an ion that neutralizes the charge.

Preferably, at least one of $R_1$ and $R_2$ represents a functional group bindable to hydroxyl group. In this case, the viologen compound is adsorbable or fixable to a transparent electrode (e.g., ITO). Such a viologen compound is advantageously adsorbable or fixable to the transparent electrode even when carrier particles comprising metal oxides are disposed on the transparent electrode. More preferably, both of $R_1$ and $R_2$ each represent a functional group bindable to hydroxyl group.

Specific examples of the functional group bindable to hydroxyl group include, but are not limited to, phosphonate group, phosphate group, carboxyl group, sulfonyl group, silyl group, and silanol group. Among these groups, phosphonate group, phosphate group, and carboxyl group are preferable, and phosphonate group is most preferable, for the ease of synthesis, adsorptivity to carrier particles comprising metal oxides disposed on the transparent electrode, and stability of the compound.

Specific examples of the phosphonate group include, but are not limited to, methylphosphonate group, ethylphosphonate group, propylphosphonate group, hexylphosphonate group, octylphosphonate group, decylphosphonate group, dodecylphosphonate group, octadecylphosphonate group, benzylphosphonate group, phenylethylphosphonate group, phenylpropylphosphonate group, and biphenylphosphonate group.

Specific examples of the phosphate group include, but are not limited to, methylphosphate group, ethylphosphate group, propylphosphate group, hexylphosphate group, octylphosphate group, decylphosphate group, dodecylphosphate group, octadecylphosphate group, benzylphosphate group, phenylethylphosphate group, phenylpropylphosphate group, and biphenylphosphate group.

Specific examples of the carboxyl group include, but are not limited to, methylcarboxyl group, ethylcarboxyl group, propylcarboxyl group, hexylcarboxyl group, octylcarboxyl group, decylcarboxyl group, dodecylcarboxyl group, octadecylcarboxyl group, benzylcarboxyl group, phenylethylcarboxyl group, phenylpropylcarboxyl group, biphenylcarboxyl group, 4-propylphenylcarboxyl group, and 4-propylbiphenylcarboxyl group.

Specific examples of the sulfonyl group include, but are not limited to, methylsulfonyl group, ethylsulfonyl group, propylsulfonyl group, hexylsulfonyl group, octylsulfonyl group, decylsulfonyl group, dodecylsulfonyl group, octadecylsulfonyl group, benzylsulfonyl group, phenylethylsulfonyl group, phenylpropylsulfonyl group, and biphenylsulfonyl group.

Specific examples of the silyl group include, but are not limited to, methylsilyl group, ethylsilyl group, propylsilyl group, hexylsilyl group, octylsilyl group, decylsilyl group, dodecylsilyl group, octadecylsilyl group, benzylsilyl group, phenylethylsilyl group, phenylpropylsilyl group, and biphenylsilyl group.

Specific examples of the silanol group include, but are not limited to, methylsilanol group, ethylsilanol group, propylsilanol group, hexylsilanol group, octylsilanol group, decylsilanol group, dodecylsilanol group, octadecylsilanol group, benzylsilanol group, phenylethylsilanol group, phenylpropylsilanol group, and biphenylsilanol group.

In the general formula (I), the ion $X^-$ for neutralizing the charge is not particularly limited as long as it represents a monovalent anion capable of forming a stable pair with the cation moiety. Specific preferred examples of the ion $X^-$ for neutralizing the charge include, but are not limited to, Br ion ($Br^-$), Cl ion ($Cl^-$), I ion ($I^-$), Otf (triflate) ion ($Otf^-$), $ClO_4$ ion ($ClO_4^-$), $PF_6$ ion ($PF_6^-$), and $BF_4$ ion ($BF_4^-$).

Preferably, the viologen compound is a symmetric system having an alkyl chain with a specific length. In this case, in the formula (I), preferably, each of m and n independently represents an integer of from 4 to 10. More preferably m and n represent the same integer.

Specific examples of the viologen compound include the following Example Compounds, but are not limited thereto.

Example Compound A

[Chem. 59]

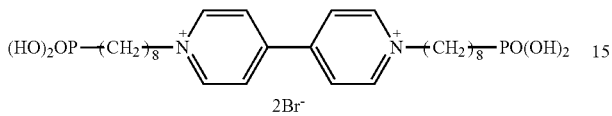

Example Compound B

[Chem. 60]

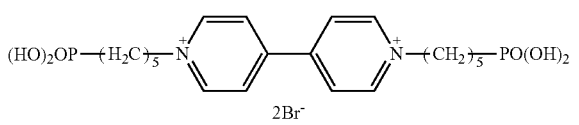

Example Compound C

[Chem. 61]

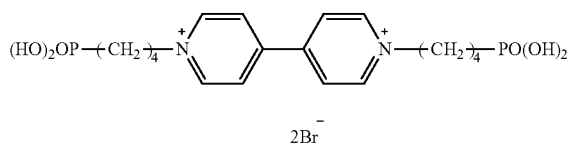

Example Compound D

[Chem. 62]

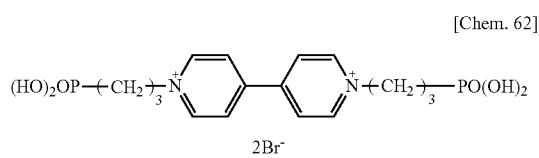

Example Compound E

[Chem. 63]

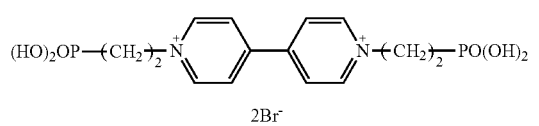

Example Compound F

[Chem. 64]

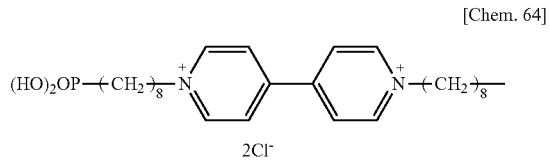

Example Compound G

[Chem. 65]

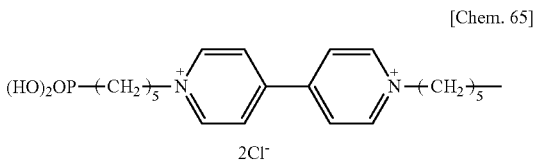

Example Compound H

[Chem. 66]

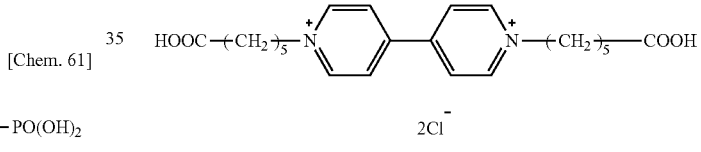

Example Compound I

[Chem. 67]

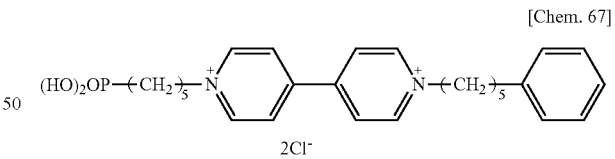

Example Compound J

[Chem. 68]

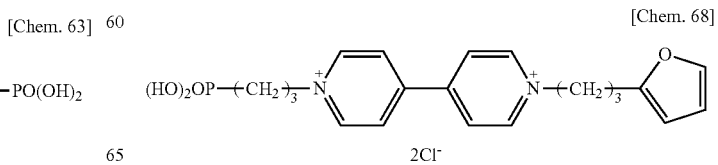

Example Compound K

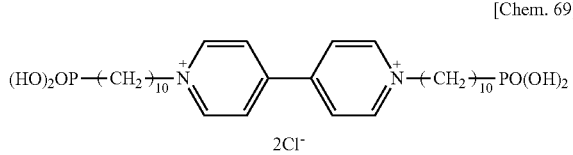

[Chem. 69]

Conductive or Semiconductive Nanostructural Body

The conductive or semiconductive nanostructural body is described in detail below.

Preferably, the conductive or semiconductive nanostructural body is transparent.

In the general formula (I), at least one of $R_1$ and $R_2$ represents a functional group bindable to hydroxyl group. The bonding or adsorption structure of the viologen compound to the conductive or semiconductive nanostructural body includes phosphonate group, sulfonate group, phosphate group, or carboxyl group. In this case, the second electrochromic compound can be easily complexed with the nanostructural body, thus providing an electrochromic complex having excellent color image maintainability.

The viologen compound may have multiple phosphonate groups, sulfonate groups, phosphate groups, and/or carboxyl groups. In a case in which the viologen compound has silyl group or silanol group, the viologen compound can be strongly bound to the nanostructural body via siloxane bond, thus providing an electrochromic complex having good stability. Here, the siloxane bond refers to a chemical bond between a silicon atom and an oxygen atom.

The electrochromic complex is not limited in bonding structure or configuration as long as it has a configuration in which the viologen compound and the nanostructural body are bound to each other via siloxane bond.

The conductive or semiconductive nanostructural body refers to a structural body having nanometer-scale irregularities, such as nanoparticles and nanoporous structural bodies. The conductive or semiconductive nanostructural body is preferably made of a metal oxide for transparency and conductivity.

Specific examples of the metal oxide include, but are not limited to, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, indium oxide, aluminosilicate, calcium phosphate, and those containing aluminosilicate as the main ingredient. Each of these materials can be used alone or in combination with others. For electric properties (e.g., electric conductivity) and physical properties (e.g., optical property), titanium oxide, zinc oxide, tin oxide, zirconium oxide, iron oxide, magnesium oxide, indium oxide, and tungsten oxide are preferable, and titanium oxide is most preferable. When such a metal oxide or a mixture of these metal oxides is used, a response speed in coloring and decoloring is excellent.

Preferably, the metal oxide is in the form of fine particles having an average primary particle diameter of 30 nm or less. As the average primary particle diameter of the metal oxide becomes smaller, light transmittance of the metal oxide is improved and the surface area per unit volume (hereinafter "specific surface area") of the electrochromic complex is increased. As the specific surface area becomes larger, the second electrochromic compound can be carried by the conductive or semiconductive nanostructural body in a more efficient manner, thus providing a multi-color display with an excellent display contrast ratio between coloring and decoloring. The specific surface area of the electrochromic complex is not particularly limited and may be appropriately selected depending on the purpose, but is preferably 100 $m^2/g$ or more.

The average primary particle diameter of fine particles of the metal oxide is determined by observing 100 randomly-selected fine particles of the metal oxide with a transmission electron microscope (TEM) to measure the projected area of each fine particle, calculating an equivalent circle diameter of each projected area, and averaging the calculated equivalent circle diameter values.

The second electrochromic layer can be formed by vacuum vapor deposition, sputtering, or ion plating. The second electrochromic layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

The average thickness of the second electrochromic layer is not particularly limited and may be appropriately selected depending on the purpose, but is preferably from 0.2 to 5.0 μm. When the average thickness is 0.2 μm or greater, proper coloring density can be achieved. When the average thickness is 5.0 μm or less, either an increase of manufacturing cost or a decrease of visibility caused due to coloring can be prevented. The second electrochromic layer can be formed by means of vacuum film formation, but is preferably formed by coating of a particle-dispersed paste for productivity.

First Substrate and Second Substrate

The first substrate and the second substrate have a function of supporting the first electrode, the first electrochromic layer, the second electrode, the second electrochromic layer, etc. As the substrate, known organic materials and inorganic materials can be used as they are as long as they are transparent materials capable of supporting each layer.

Specific examples of the substrate include, but are not limited to, glass substrates made of non-alkali glass, borosilicate glass, float glass, or soda-lime glass. Specific examples of the substrate further include, but are not limited to, resin substrates made of polycarbonate resin, acrylic resin, polyethylene resin, polyvinyl chloride resin, polyester resin, epoxy resin, melamine resin, phenol resin, polyurethane resin, or polyimide resin. The substrate may have a surface coating such as a transparent insulating layer, a UV cut layer, and/or an antireflection layer, for improving vapor barrier property, gas barrier property, ultraviolet resistance, and visibility.

The planer shape of the substrate is not particularly limited and can be appropriately selected according to the purpose. For example, the planar shape may be rectangular or circular. The substrate may be a stack of multiple layers. As an example, an electrochromic element sandwiched by two glass substrates provides improved vapor barrier property and gas barrier property.

Other Members

The other members are not particularly limited and can be appropriately selected according to the purpose. Examples thereof include, but are not limited to, an insulating porous layer, an anti-deterioration layer, and a protective layer.

Insulating Porous Layer

The insulating porous layer has a function of electrically insulating the first electrode and the second electrode from each other and another function of holding the electrolyte. The material of the insulating porous layer is not particularly limited as long as it is porous. Preferred examples of such materials include, but are not limited to, organic and inorganic materials having high insulating property, durability, and film-formation property and composite materials thereof.

The insulating porous layer can be formed by, for example, a sintering method (in which fine polymer particles or inorganic particles are partially fused with each other via a binder to form pores between the particles), an extraction method (in which solvent-soluble organic or inorganic substances and solvent-insoluble binders are formed into a layered structure, and the organic or inorganic substances are dissolved with a solvent to form pores), a foaming method, a phase inversion method in which a mixture of polymers is subjected to phase separation by handling a good solvent and a poor solvent, and a radiation irradiation method in which pores are formed by means of radiation.

Anti-Deterioration Layer

The function of the anti-deterioration layer is to undergo the reverse reaction of a reaction occurring in the first electrochromic layer and the second electrochromic layer to balance the charges therebetween, so that the first electrode and the second electrode are prevented from being corroded or degraded by an irreversible redox reaction. The reverse reaction includes both a redox reaction of the anti-deterioration layer and an action thereof as a capacitor.

The material of the anti-deterioration layer is not particularly limited and can be appropriately selected according to the purpose as long as it has a function of preventing the first electrode and the second electrode from being corroded through an irreversible redox reaction. Specific examples of the material of the anti-deterioration layer include, but are not limited to, antimony tin oxide, nickel oxide, titanium oxide, zinc oxide, tin oxide, and conductive or semiconductive metal oxides containing two or more of these materials. The anti-deterioration layer may be comprised of a porous thin film which does not inhibit injection of an electrolyte. Such a porous thin film providing excellent electrolyte permeability and anti-deterioration property can be obtained by, for example, fixing fine particles of a conductive or semiconductive metal oxide (e.g., antimony tin oxide, nickel oxide, titanium oxide, and zinc oxide, tin oxide) on the second electrode with a binder (e.g., acrylic binder, alkyd binder, isocyanate binder, urethane binder, epoxy binder, and phenol binder).

Protective Layer

The protective layer has functions of protecting the electrochromic element from external stress and chemicals used in the washing process, preventing leakage of the electrolyte, and preventing intrusion of substances unnecessary for stable operation of the electrochromic element, such as moisture and oxygen in the air.

Specific examples of the material of the protective layer include, but are not limited to, ultraviolet-curable or heat-curable resins such as acrylic resin, urethane resin, and epoxy resin.

The average thickness of the protective layer is not particularly limited and may be appropriately selected according to the purpose, but is preferably from 1 to 200 µm.

Method for Manufacturing Electrochromic Element according to First Embodiment A method for manufacturing the electrochromic element according to the first embodiment is described below.

First, the display electrode 12 is formed on the first substrate 11. Next, the display electrode 12 is coated with a coating liquid (electrolyte liquid) containing the first electrochromic composition containing the electrochromic compound according to the present embodiment and the other radical-polymerizable compound. Thus, a first laminated body is prepared in which the display electrode 12 and the first electrochromic layer 13, in this order, are formed on the first substrate 11.

Specific examples of the electrochromic compound and the other radical-polymerizable compound used here include the above-described materials exemplified for the electrochromic element according to the first embodiment.

The coating liquid may be diluted with a solvent, if necessary, before being applied. Specific examples of the solvent include, but are not limited to, alcohol solvents (e.g., methanol, ethanol, propanol, butanol), ketone solvents (e.g., acetone, methyl ethyl ketone, methyl isobutyl ketone, cyclohexanone), ester solvents (e.g., ethyl acetate, butyl acetate), ether solvents (e.g., tetrahydrofuran, dioxane, propyl ether), halogen solvents (e.g., dichloromethane, dichloroethane, trichloroethane, chlorobenzene), aromatic solvents (e.g., benzene, toluene, xylene), and cellosolve solvents (e.g., methyl cellosolve, ethyl cellosolve, cellosolve acetate). Each of these materials can be used alone or in combination with others.

The rate of dilution can be appropriately selected depending on solubility of the first electrochromic composition, the type of coating method, and a target thickness of the first electrochromic layer.

The coating method may be, for example, dip coating, spray coating, bead coating, and ring coating.

The method for manufacturing the electrochromic element according to the present embodiment may further include a polymerization/cross-linking process for polymerizing/cross-linking the first electrochromic composition by externally applying energy thereto.

In the polymerization/cross-linking process, the first electrochromic composition applied onto the first electrode is cured by externally applying energy thereto, thus forming a first electrochromic layer. The external energy may be, for example, heat energy, light energy, or radial rays. A method of applying heat energy may be, for example, performing heating from the coated-surface side or the substrate-side with a gaseous substance (e.g., air, nitrogen gas), vapor, a heat medium, infrared rays, or electromagnetic waves.

The heating temperature is not particularly limited and may be appropriately selected depending on the purpose, but is preferably in the range of from 60 to 170 degrees C. Light energy may be given from a UV light source having a main light-emitting wavelength within the ultraviolet range, such as a high-pressure mercury lamp and a metal halide lamp, or a visible light source which emits light corresponding to the absorption wavelength of the radical polymerizable compounds and/or the photopolymerization initiator. The irradiation amount of UV light is not particularly limited and may be appropriately selected according to the purpose, but is preferably in the range of from 5 to 15,000 mW/cm$^2$.

Next, the counter electrode 16 is formed on the second substrate 17. The counter electrode 16 is thereafter coated with a coating liquid containing an electrochromic complex comprising the second electrochromic composition and the conductive or semiconductive nanostructural body. Thus, a second laminated body is prepared in which the counter electrode 16 and the second electrochromic layer 15, in this order, are formed on the second substrate 17.

Specific examples of the second electrochromic composition and the conductive or semiconductive nanostructural body contained in the electrochromic complex include the above-described materials exemplified for the electrochromic element according to the first embodiment.

Next, the gap between the first laminated body and the second laminated body is filled with an electrolyte liquid, so that the first laminated body and the second laminated body are disposed via the electrolyte layer 14A. Thus, the electrochromic element 10A according to the present embodiment is prepared. In a case in which the electrolyte constituting the electrolyte layer 14A is curable by light or heat, the electrolyte is cured after the first laminated body and the second laminated body are bonded to each other via the electrolyte.

The method for manufacturing the electrochromic element according to the present embodiment may further include other processes, as necessary.

For example, in a case in which the electrochromic element 10A further comprises an insulating porous layer, the method may further include a process of forming the insulating porous layer on the first electrochromic layer 13. Alternatively, the insulating porous layer may be formed on the lower side of the second electrochromic layer 15, or mixed with the electrolyte constituting the electrolyte layer 14A.

In a case in which the electrochromic element 10A further comprises an anti-deterioration layer and/or a protective layer, the method may include a process of forming these layers in the electrochromic element 10A.

Electrochromic Element according to Second Embodiment

The electrochromic element according to the second embodiment is described in detail below. An electrochromic element 10B according to the second embodiment is free of the first electrochromic layer 13 and the second electrochromic layer 15 that are contained the electrochromic element 10A according to the first embodiment illustrated in FIG. 1. In addition, the electrochromic element 10B according to the second embodiment has an electrolyte layer containing the electrochromic composition according to the present embodiment in place of the electrolyte layer 14A contained in the electrochromic element 10A according to the first embodiment.

Figure 2:
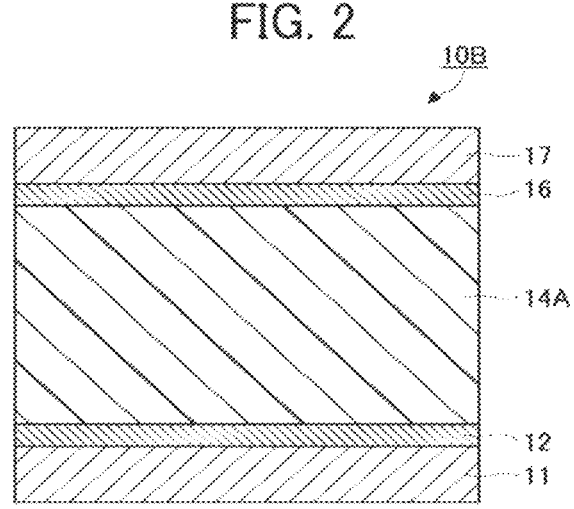
FIG. 2 is a schematic cross-sectional view of an electrochromic element according to a second embodiment of the present invention.

FIG. 2 is a schematic cross-sectional view of the electrochromic element according to the second embodiment. Referring to FIG. 2, the electrochromic element 10B comprises a first substrate 11, a display electrode 12, an electrolyte layer 14B, a counter electrode 16, and a second substrate 17. These members are stacked in this order from the first substrate 11 side. The electrolyte layer 14B contains the electrochromic composition according to the present embodiment and an electrolyte. Since the other members constituting the electrochromic element 10B are the same as those constituting the electrochromic element 10A, detailed explanations thereof are omitted.

Method for Manufacturing Electrochromic Element according to Second Embodiment

A method for manufacturing the electrochromic element according to the second embodiment is described below. The method for manufacturing the electrochromic element 10B according to the second embodiment is free of a process of forming the first electrochromic layer 13 and the second electrochromic layer 15 that are formed in the electrochromic element 10A according to the first embodiment. The method for manufacturing the electrochromic element 10B according to the second embodiment includes a process of forming the electrolyte layer 14B containing the electrochromic composition according to the present embodiment in place of the electrolyte layer 14A.

Thus, the display electrode 12 is formed on the first substrate 11. The counter electrode 16 is formed on the second substrate 17.

Next, an electrolyte liquid containing the electrochromic composition according to the present embodiment and an electrolyte is prepared. The gap between the display electrode 12 and the counter electrode 16 is filled with the electrolyte liquid, so that the display electrode 12 and the counter electrode 16 are disposed via the electrolyte layer 14B. Thus, the electrochromic element 10B according to the present embodiment is prepared.

The electrochromic elements according to the above embodiments have excellent light durability and repetition durability. Therefore, the electrochromic elements according to the above embodiments can be used for, for example, electrochromic display, large-size displays such as stock price display, and light control elements such as anti-glare mirror and light control glass. In addition, the electrochromic elements according to the above embodiments can be preferably used for low-voltage driving elements such as touch-panel-type key switch, optical switch, optical memory, electronic paper, and electronic album.

The above-described embodiments are described only as examples for illustration and the present invention is not limited by the above-described embodiments. The above-described embodiments can be implemented in other various forms, and various combinations, omissions, replacements, changes, and the like can be made without departing from the scope of the invention. These embodiments and modifications thereof are included in the scope and gist of the invention.

EXAMPLES

Further understanding can be obtained by reference to certain specific examples which are provided herein for the purpose of illustration only and are not intended to be limiting.

Example 1
Synthesis Example 1 Synthesis of Electrochromic Compound 1
An electrochromic compound 1 was synthesized according to the following synthesis scheme (1).
Synthesis Scheme (1)
[Chem. 70]
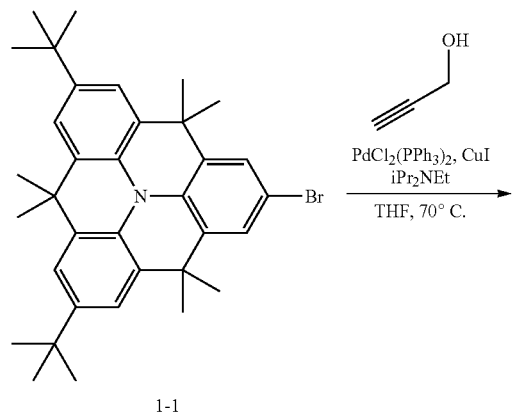
Synthesis of Compound 1-1
The following compound 1-1 was synthesized according to the method described in Zhen Fang, et. Al., J. Mater. Chem., 22, 2017, 15397-15404.
[Chem. 71]

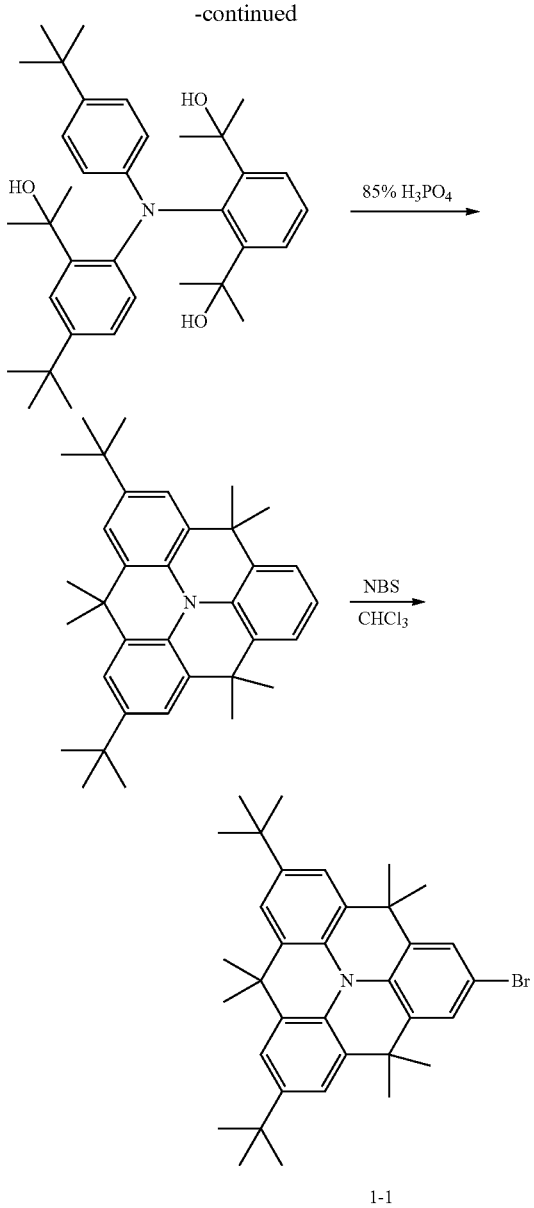

Synthesis of Compound 1-2

A four-necked flask was charged with the compound 1-1 (2.78 g, 5.0 mmol), 2-propyne-1-ol (0.34 g, 6.0 mmol), diisopropylethylamine (10 mL), and tetrahydrofuran (hereinafter "THF", 30 mL). After conducting a degassing with argon gas for 15 minutes, copper (I) iodide (5% by mol, 47 mg) and dichlorobis(triphenylphosphine)palladium (II) (5% by mol, 175 mg) were added to the flask and heat-stirred for 12 hours at an inner temperature of 70 degrees C. under argon atmosphere. The liquid in the flask was cooled to room temperature and filtered through silica gel. The silica gel was washed with ethyl acetate, and the collected filtrate was condensed under reduced pressure. The residue was purified by silica gel column chromatography (eluent: hexane/ethyl acetate=7/3 by volume). The purified residue was thereafter condensed under reduced pressures. Thus, a compound 1-2 was prepared (yield: 1.86 g, 70%) as a pale yellow amorphous.

Synthesis of Compound 1-3

A flask was charged with the compound 1-2 (1.85 g, 3.48 mmol), ethanol (20 mL), and THF (30 mL). After the flask was purged with nitrogen gas, palladium carbon (containing 10% of Pd, available from FUJIFILM Wako Pure Chemical Corporatione, 185 mg) was gradually added to the flask. After the inside of the flask was replaced with hydrogen gas, the contents of the flask were stirred at hydrogen pressure (1 atm) for 16 hours. The resulting liquid was filtered through CELITE and the CELITE was washed with THF. The collected filtrate was condensed under reduced pressure. The residue was purified by silica gel column chromatography (eluent: hexane/ethyl acetate=7/3 by volume). The purified residue was thereafter condensed under reduced pressures. Thus, a compound 1-3 was prepared (yield: 1.77 g, 95%) as a pale yellow amorphous.

Synthesis of Electrochromic Compound 1

In a four-neck flask purged with argon gas, the compound 1-3 (1.75 g, 3.3 mmol), dimethylaminopyridine (10 mg), THF (30 mL), and pyridine (10 mL) were placed and cooled to 0 degrees C. Acryloyl chloride (358 mg, 4.0 mmol) was dropped therein and stirred at the temperature as it was for 30 minutes. The temperature was then returned to room temperature, and stirring was further performed for 3 hours. Next, ethyl acetate and water were added to separate the organic phase. The aqueous phase was extracted with ethyl acetate three times. The collected organic phase was washed with water twice and with a saturated salt solution once. The organic phase was dried with sodium sulfate and, after the drying agent was separated, condensed. The residue was purified by column chromatography (elute: hexane/ethyl acetate=9/1 by volume). The resulting liquid was added with 2,6-di-tert-butyl-p-cresol (hereinafter "BHT", 1.6 mg) and condensed. Thus, an electrochromic compound 1 was prepared (yield: 1.65 g, 85%) as a colorless solid.

The electrochromic compound 1 was identified by a nuclear magnetic resonance spectrometer $^1$H-NMR (product of JEOL Ltd., 500 MHz) and a mass spectrometer (LCT-Premier with ASAP Probe, product of Waters Corporation). As a result, it was confirmed from the identified structure and molecular weight that the above-prepared compound was the objective electrochromic compound 1.

Synthesis Example 2 Synthesis of Electrochromic Compound 2

The electrochromic compound 2 was synthesized according to the following synthesis scheme (2).

Synthesis Scheme (2)

[Chem. 72]

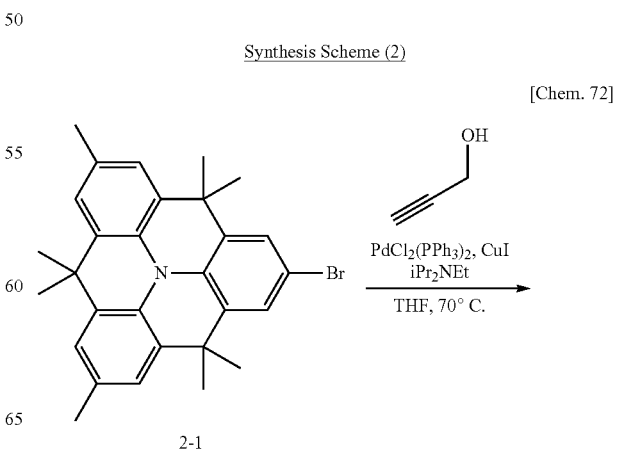

55
-continued

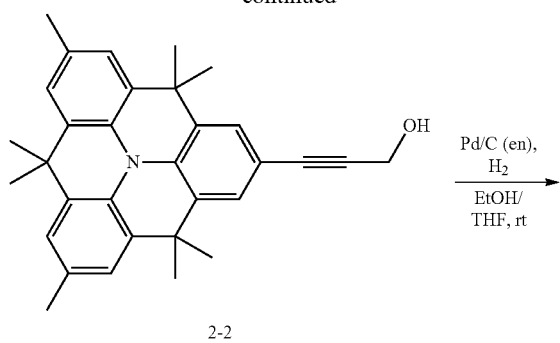

2-2

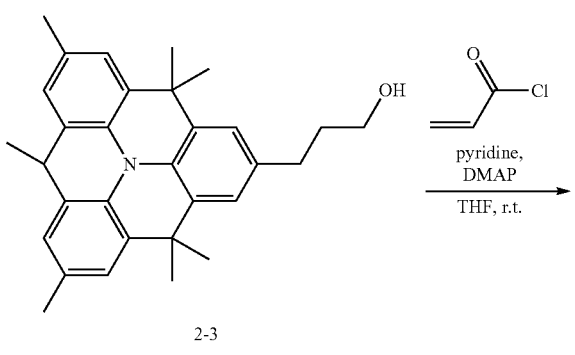

2-3

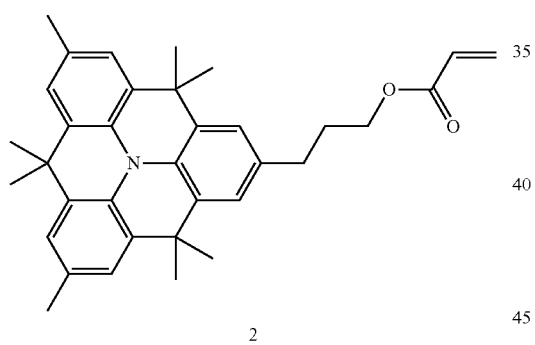

2

Synthesis of Compound 2-1

The following compound 2-1 was synthesized according to the method described in Zhen Fang, et. Al., J. Mater. Chem., 22, 2017, 15397-15404.

[Chem. 73]

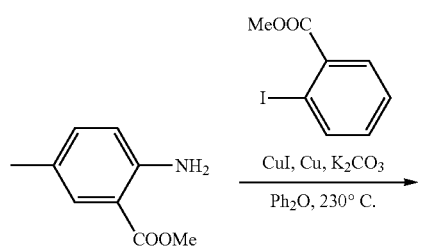

56
-continued

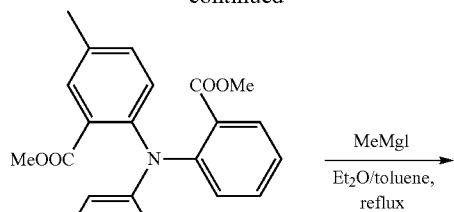

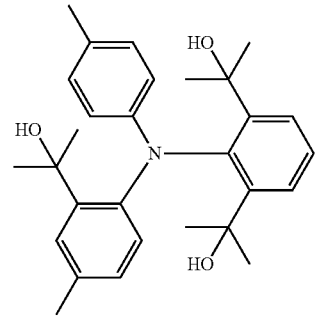

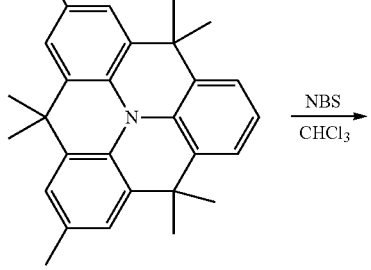

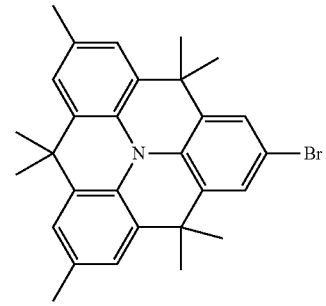

2-1

Compounds 2-2 and 2-3 were synthesized in by the same method as the method of synthesizing the electrochromic compound 1 (i.e., the above-described scheme (1)). Thereafter, the solution of the compound 2-3 having been purified by column chromatography was added with 2,6-di-tert-butyl-p-cresol (BHT, 1.5 mg) and condensed into a colorless viscous liquid. Thus, an electrochromic compound 2 was prepared (yield. 1.50 g, 87%).

The electrochromic compound 2 was identified by a nuclear magnetic resonance spectrometer $^1$H-NMR (product of JEOL Ltd., 500 MHz) and a mass spectrometer (LCT-Premier with ASAP Probe, product of Waters Corporation). As a result, it was confirmed from the identified structure and molecular weight that the above-prepared compound was the objective electrochromic compound 2.

Synthesis Example 3 Synthesis of Electrochromic Compound 3
The electrochromic compound 3 was synthesized according to the following synthesis scheme (3)
Synthesis of Compound 3-1
The following compound 3-1 was synthesized according to the method described in Zhen Fang, et. Al., J. Mater. Chem., 22, 2017, 15397-15404.
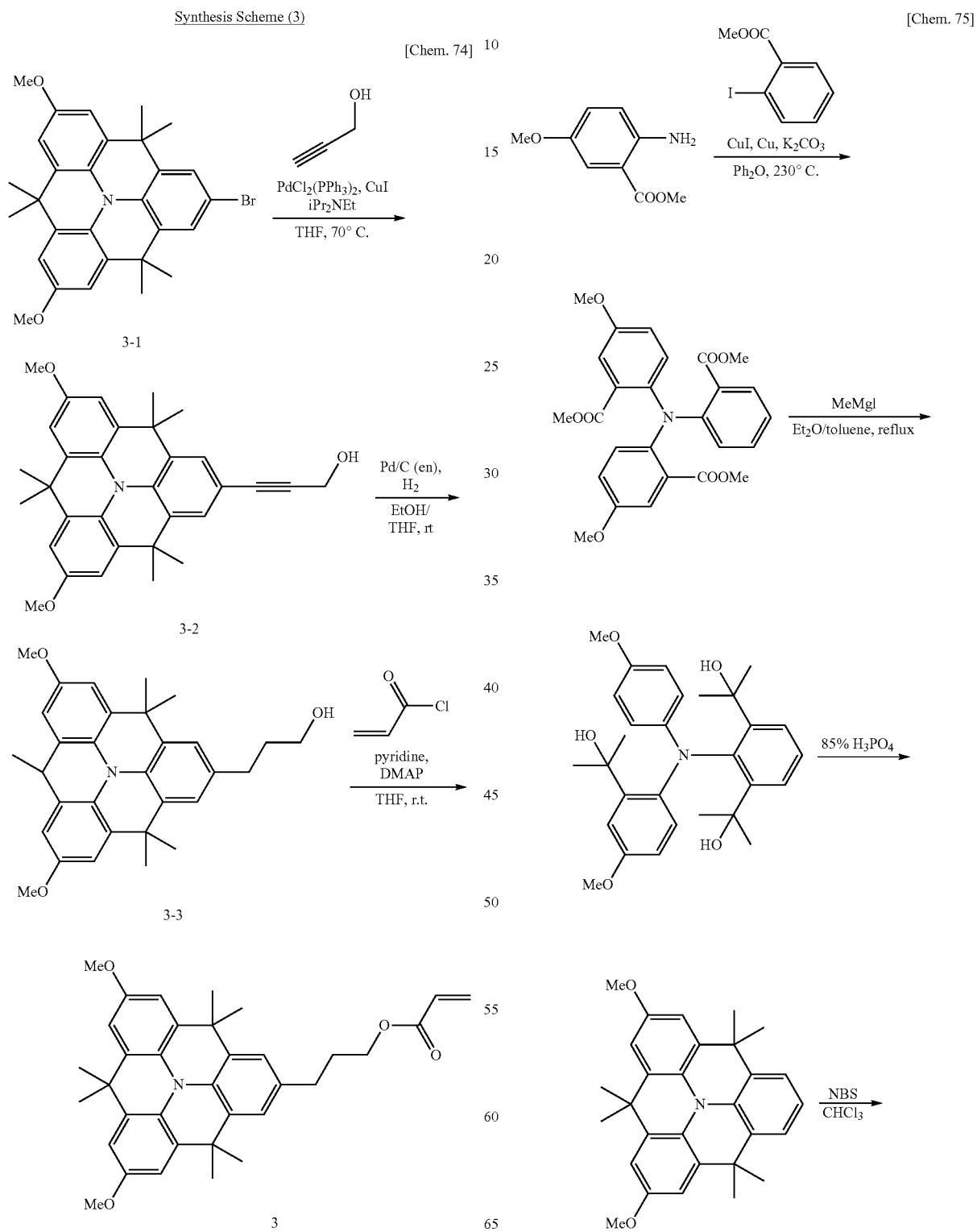

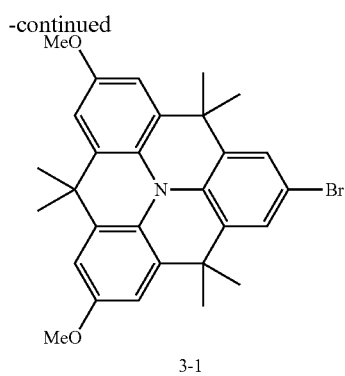

3-1

Compounds 3-2 and 3-3 were synthesized by the same method as the method of synthesizing the electrochromic compound 1 (i.e., the above-described scheme (1)). Thereafter, the solution of the compound 3-3 having been purified by column chromatography was added with 2,6-di-tert-butyl-p-cresol (BHT, 1.3 mg) and condensed into a colorless viscous liquid. Thus, an electrochromic compound 3 was prepared (yield: 1.30 g, 75%).

The electrochromic compound 3 was identified by a nuclear magnetic resonance spectrometer $^1$H-NMR (product of JEOL Ltd., 500 MHz) and a mass spectrometer (LCT-Premier with ASAP Probe, product of Waters Corporation). As a result, it was confirmed from the identified structure and molecular weight that the above-prepared compound was the objective electrochromic compound 3.

Synthesis Example 4 Synthesis of Electrochromic Compound 4

The electrochromic compound 4 was synthesized according to the following synthesis scheme (4).

Synthesis Scheme (4)

[Chem. 76]

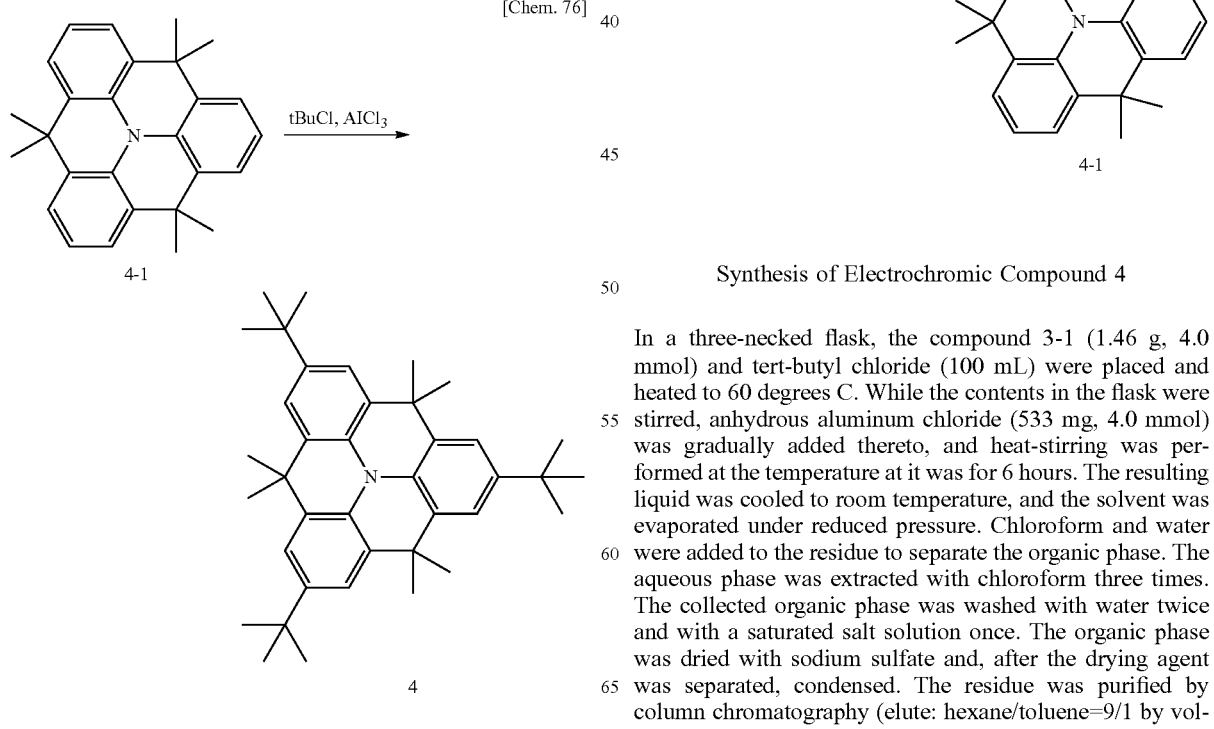

Synthesis of Compound 4-1

The following compound 4-1 was synthesized according to the method described in Zhen Fang, et. Al., J. Mater. Chem., 22, 2017, 15397-15404.

[Chem. 77]

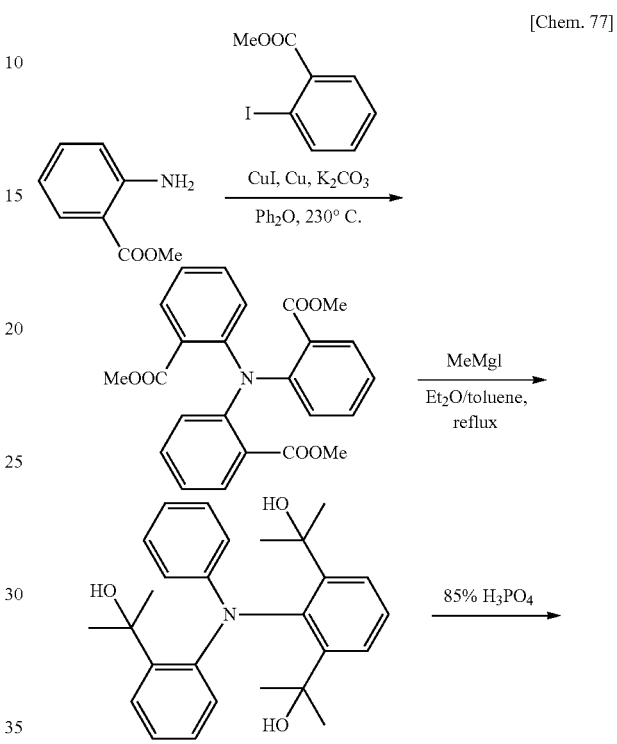

Synthesis of Electrochromic Compound 4

In a three-necked flask, the compound 3-1 (1.46 g, 4.0 mmol) and tert-butyl chloride (100 mL) were placed and heated to 60 degrees C. While the contents in the flask were stirred, anhydrous aluminum chloride (533 mg, 4.0 mmol) was gradually added thereto, and heat-stirring was performed at the temperature at it was for 6 hours. The resulting liquid was cooled to room temperature, and the solvent was evaporated under reduced pressure. Chloroform and water were added to the residue to separate the organic phase. The aqueous phase was extracted with chloroform three times. The collected organic phase was washed with water twice and with a saturated salt solution once. The organic phase was dried with sodium sulfate and, after the drying agent was separated, condensed. The residue was purified by column chromatography (elute: hexane/toluene=9/1 by volume). The solid obtained by condensation was recrystallized from toluene/ethanol. Thus, an electrochromic compound 4 was prepared (yield: 1.71 g, 80%) as a colorless plate crystal.

The electrochromic compound 4 was identified by a nuclear magnetic resonance spectrometer $^1$H-NMR (product of JEOL Ltd., 500 MHz) and a mass spectrometer (LCT-Premier with ASAP Probe, product of Waters Corporation). As a result, it was confirmed from the identified structure and molecular weight that the above-prepared compound was the objective electrochromic compound 4.

Synthesis Example 5 Synthesis of Electrochromic Compound 5

The electrochromic compound 5 was synthesized according to the following synthesis scheme (5).

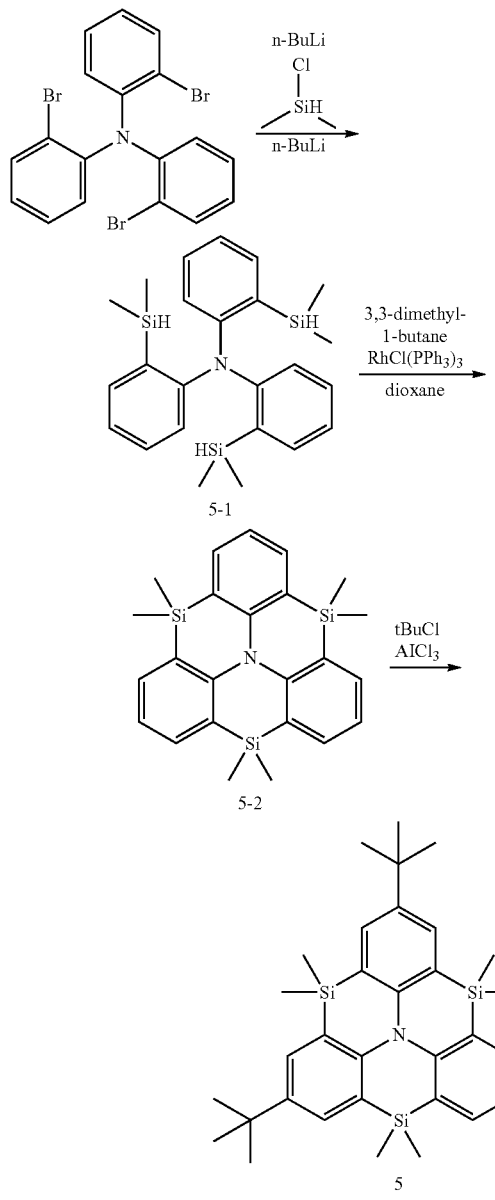

Synthesis of Electrochromic Compound 5

Compounds 5-1 and 5-2 were synthesized according to the method described in Chemical Communications, 2014, 50 (99), 15760-15763.

Synthesis of Compound 5-1 Under argon atmosphere, a three-necked flask was charged with tris(2-bromophenyl)amine (4.82 g, 10 mmol) and dehydrated THF (80 mL) and cooled to −78 degrees C. n-Butyllithium (1.6 M, hexane solution, 31.5 mmol, 19.7 mL) was dropped therein and stirred at the temperature as it was for 1.5 hours. Subsequently, chlorodimethylsilane (3.9 mL, 36 mmol) was added thereto, the temperature was returned to room temperature, and stirring was performed for 16 hours. The resulting liquid was quenched by addition of water, and chloroform was further added thereto to separate the organic phase. The aqueous phase was extracted with chloroform twice. The collected organic phase was dried with anhydrous sodium sulfate. The filtrate was condensed, and the residue was purified by column chromatography (elute: hexane/toluene=9/1 by volume). The solid obtained by condensation was recrystallized from toluene/ethanol. Thus, a compound 5-1 was prepared (yield: 2.95 g, 70%) as a colorless solid.

Synthesis of Compound 5-2

Under an argon atmosphere, the compound 5-1 (2.95 g, 7 mmol), 3,3-dimethyl-1-butene (4.5 mL, 35 mmol), RhCl(PPh$_3$)$_3$ (32 mg, 0.035 mmol), and 1,4-dioxane (70 mL) were placed in a three-necked flask and stirred at 135 degrees C. for 48 hours. The contents in the flask were cooled to room temperature, and the residue was purified by column chromatography (elute: hexane/toluene=9/1 by volume). The solid obtained by condensation was recrystallized from toluene/ethanol. Thus, a compound 5-2 was prepared (yield: 1.73 g, 60%) as a colorless solid.

Synthesis of Electrochromic Compound 5

The procedure for preparing the electrochromic compound 4 was repeated except for replacing the compound 4-1 with the compound 5-1. Thus, an electrochromic compound 5 was prepared (yield: 1.95 g, 80%) as a colorless plate crystal.

Preparation of First Electrochromic Element

Example 1-1

An electrochromic element of Example 1-1 was prepared as follows.

Formation of First Electrochromic Layer on First Electrode
To form a first electrochromic layer on a first electrode, a first electrochromic composition containing the following materials was prepared.

Materials

Electrochromic compound 1-1 having acryloxy group (Example Compound 1): 50 parts by mass
IRGACURE 184 (available from BASF Japan Ltd.): 5 parts by mass
Polyethylene glycol having diacryloxy group (PEG400DA available from Nippon Kayaku Co., Ltd.): 50 parts by mass
Methyl ethyl ketone: 900 parts by mass An ITO glass substrate (having an area of 40 mm×40 mm, a thickness of 0.7 mm, and an ITO film thickness of about 100 nm) serving as a first electrode was coated with the first electrochromic composition by spin coating. The coating layer was exposed to ultraviolet ray emitted from an UV emitter (SPOT CURE available from Ushio Inc.) at 10 mW for 60 seconds, then subjected to an annealing treatment at 60 degrees C. for 10 minutes. Thus, a first electrochromic layer having an average thickness of 400 μm and a cross-linked structure was formed.

Formation of Anti-deterioration Layer on Second Electrode Another ITO glass substrate (having an area of 40 mm×40 mm, a thickness of 0.7 mm, and an ITO film thickness of about 100 nm) serving as a second electrode was coated with a titanium oxide nanoparticle dispersion liquid (SP210 available from Showa Titanium Co., Ltd., having an average particle diameter of about 20 nm) by spin coating, to form an anti-deterioration layer. The coating layer was subjected to an annealing treatment at 120 degrees C. for 15 minutes. Thus, a nanostructural semiconductive material comprised of a titanium oxide particle film having a thickness of 1.0 μm was formed.

Formation of Second Electrochromic Layer on Second Electrode

To form a second electrochromic layer on a second electrode, a second electrochromic composition containing the following materials was prepared.

Materials

Electrochromic compound 1-2 having a functional group bindable to hydroxyl group (Example Compound A): 20 parts by mass
Tetrafluoropropanol: 980 parts by mass The nanostructural semiconductive material comprised of a titanium oxide particle film, formed on the second electrode, was then coated and adsorbed with the second electrochromic composition by spin coating. Non-adsorbed compounds were then washed with methanol. Thus, a second electrochromic layer was formed.

Filling of Electrolyte Liquid

An electrolyte liquid containing the following materials was prepared.

Materials

IRGACURE 184 (available from BASF Japan Ltd.): 5 parts by mass
PEG400DA (available from Nippon Kayaku Co., Ltd.): 100 parts by mass
1-Ethyl-3-methylimidazolium tetracyanoborate (available from Merk KGaA): 50 parts by mass The above-prepared electrolyte liquid in an amount of 30 mg was weighed with a micropipette and dropped onto the ITO glass substrate serving as the second electrode having the anti-deterioration layer and the second electrochromic layer thereon. The ITO glass substrate serving as the first electrode having the cross-linked first electrochromic layer thereon was bonded to the above ITO glass substrate serving as the second electrode while leaving lead portions, thus preparing a bonded element. The bonded element was exposed to ultraviolet ray (having a wavelength of 250 nm) emitted from a UV emitter (SPOT CURE available from Ushio Inc.) at 10 mW for 60 seconds. Thus, an electrochromic element of Example 1-1 was prepared.

Coloring/Decoloring Drive Operation

Coloring/decoloring of the electrochromic element of Example 1-1 was confirmed as follows. A voltage of −2 V was applied for 5 seconds to between the lead portions of the first electrode and the second electrode. As a result, it was confirmed that the color derived from the electrochromic compound 1 in the first electrochromic layer was developed at the portion where the first electrode and the second electrode were overlapped. In addition, it was confirmed that the color derived from the electrochromic compound 2 in the second electrochromic layer was developed. Next, a voltage of +2 V was applied for 5 seconds to between the lead portions of the first electrode and the second electrode. As a result, the portion where the first electrode and the second electrode were overlapped was decolored and became transparent.

Figure 3:
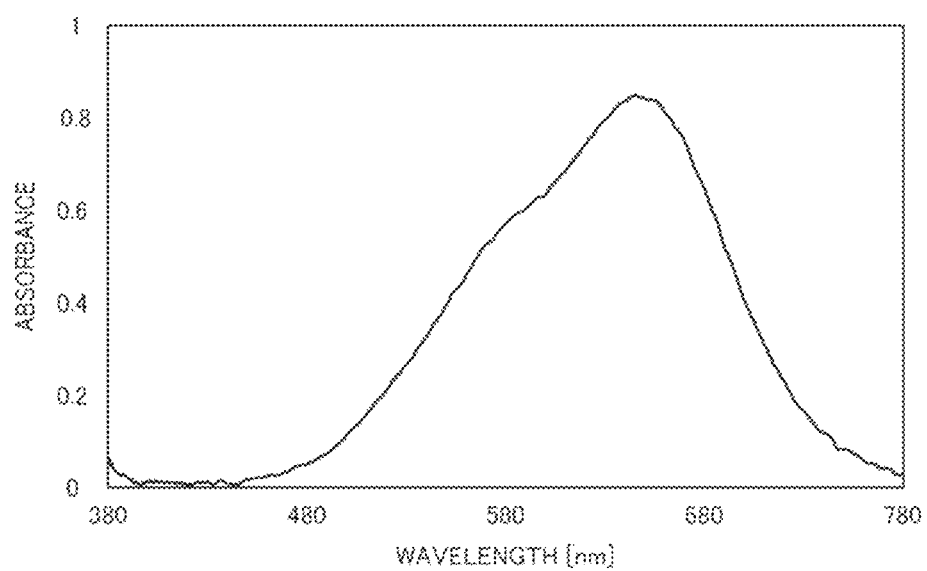
FIG. 3 is a graph showing a ultraviolet-visible absorption spectrum of an electrochromic element according to Example 1-1.

FIG. 3 is a graph showing a ultraviolet-visible absorption spectrum of the electrochromic element of the present Example in the colored state. FIG. 3 shows an ultraviolet-visible absorption spectrum of the electrochromic element of the present Example which is acquired by subtracting the ultraviolet-visible absorption spectrum at the time when the electrochromic compound 2 is colored, and that at the time when the electrochromic compound 1 and the electrochromic compound 2 are decolored, from the ultraviolet-visible absorption spectrum at the time when the electrochromic compound 1 and the electrochromic compound 2 are colored. Thus, FIG. 3 shows the ultraviolet-visible absorption spectrum at the time when the electrochromic compound 1 is colored. In FIG. 3, the absorption spectrum is illustrated within the wavelength range of from 380 to 780 nm. It was visually confirmed that both of the electrochromic compound 1 and the electrochromic compound 2 were colored in blue, as indicated in FIG. 3.

Examples 1-2 to 1-20

The procedure in Example 1-1 was repeated except for replacing the electrochromic compound 1-1 (Example Compound 1) with each of Example Compounds 2 to 20. Thus, electrochromic elements of Examples 1-2 to 1-20 were prepared. It was confirmed that the ultraviolet-visible absorption spectrum of each of the electrochromic elements of Examples 1-2 to 1-20 was similar to that of the electrochromic element of Example 1-1.

Comparative Examples 1-1 to 1-5

The procedure in Example 1-1 was repeated except for replacing the electrochromic compound 1-1 (Example Compound 1) with each of the following Comparative Compounds 1 to 5. Thus, electrochromic elements of Comparative Examples 1-1 to 1-5 were prepared. It was also confirmed that the ultraviolet-visible absorption spectrum of each of the electrochromic elements of Comparative Examples 1-1 to 1-5 was similar to that of the electrochromic element of Example 1-1.

65
Comparative Compound 1
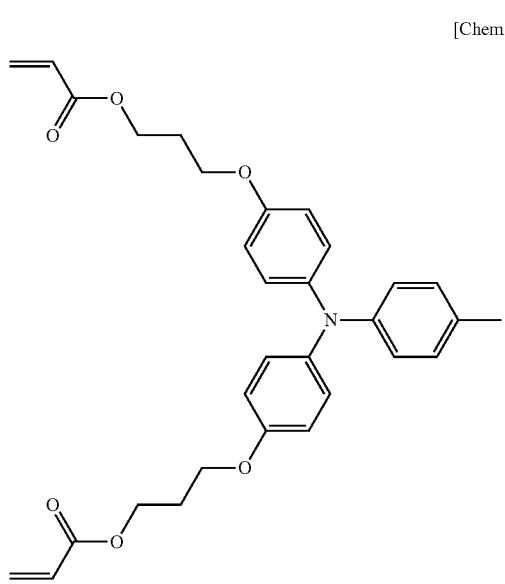
Comparative Compound 2
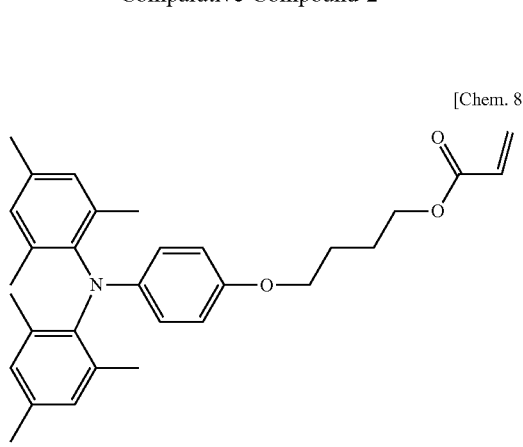
Comparative Compound 3
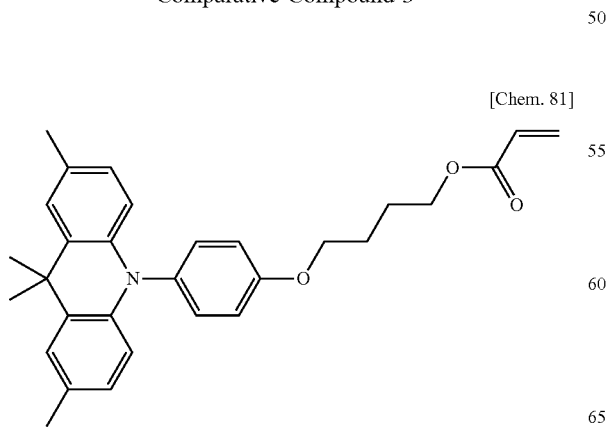
66
Comparative Compound 4
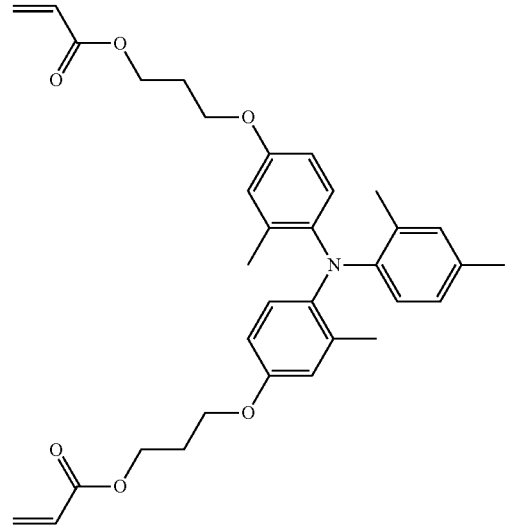
Comparative Compound 5
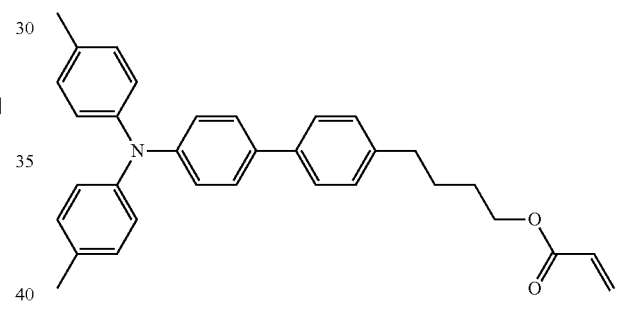
Comparative Compound 6
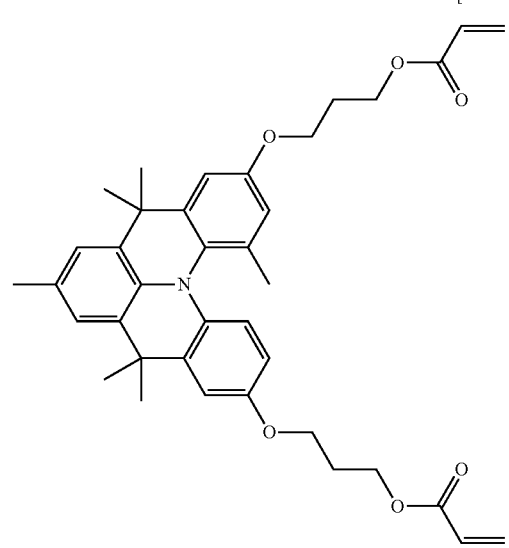

The type and application position of electrochromic compound in each Example or Comparative Example are shown in Table 1.

Evaluations

Each electrochromic element was subjected to a repetition durability test, a continuous coloring test, a light durability test, and a color test as follows.

Test 1-1: Repetition Durability Test

Each of the electrochromic elements prepared in Examples and Comparative Examples was subjected to a coloring/decoloring drive operation in which a voltage of −2 V was applied for 5 seconds and thereafter a voltage of +2 V for 5 seconds to between the lead portions of the first electrode and the second electrode. This coloring/decoloring drive operation was repeated 10,000 times. A wavelength λmax at which the absorbance became a local maximum was determined within a visible range (from 400 to 800 nm). (λmax was 700 nm in Example 1.) Repetition durability was evaluated by the change in absorbance at λmax, measured with a spectrometer USB4000, based on the following criteria. The evaluation results are presented in Table 1.

Evaluation Criteria

A+: Absorbance at λmax is 90% or more of the initial absorbance.
A: Absorbance at λmax is 80% or more of the initial absorbance.
B: Absorbance at λmax is 50% or more of the initial absorbance.
C: Absorbance at λmax is less than 50% of the initial absorbance.

Test 1-2: Continuous Coloring Test

In each of the electrochromic elements prepared in Examples and Comparative Examples, a voltage of 1.6 V was applied to between the first electrode and the second electrode, and the electrochromic element was maintained in the colored state for continuous 48 hours. The absorbance within a visible range (from 380 to 800 nm) was measured with a spectrometer USB4000 and a yellow index (YI) was calculated before and after the application of voltage. Continuous coloring property was evaluated by the difference (ΔYI) in yellow index before and after the application of voltage based on the following criteria. The evaluation results are presented in Table 1.

Evaluation Criteria

A+: ΔYI is less than 1.
A: ΔYI is not less than 1 and less than 5.
B: ΔYI is not less than 5 and less than 10.
C: ΔYI is 10 or greater.

Test 1-3: Light Durability Test

In each of the electrochromic elements prepared in Examples and Comparative Examples, a voltage of 1.6 V was applied to between the first electrode and the second electrode. While maintaining the electrochromic element in the colored state, the electrochromic element was irradiated with light emitted from an artificial solar lighting (SOLAX XC-100W available from SERIC Ltd., having an illuminance of 150,000 lux) through an ultraviolet cut filter (LUMICOOL 1501UH available from LINTEC Corporation) for continuous 48 hours. The electrochromic element was further irradiated with light emitted from a deuterium tungsten halogen light source (DH-2000 available from Ocean Optics, Inc.), and the transmitted light was detected by a spectrometer USB4000 to obtain a transmission spectrum. A wavelength λmax at which the transmittance became the minimum was determined within a visible range (from 400 to 800 nm). Light durability was evaluated by the transmittance at λmax based on the following criteria. The evaluation results are presented in Table 1.

Evaluation Criteria

A+: Transmittance at λmax is less than 10%.
A: Transmittance at λmax is not less than 10% and less than 30%.
B: Transmittance at λmax is 30% or greater.
C: Transmittance at λmax is 50% or greater.

TABLE 1

| | First Electrochromic Composition | | Second Electrochromic Composition | | | | |
|---|---|---|---|---|---|---|---|
| | Type of First Electrochromic Compound | Applied Position | Type of Second Electrochromic Compound | Applied Position | Test 1-1 | Test 1-2 | Test 3-3 |
| Example 1-2 | Example Compound 1 | First Electrochromic Layer | Example Compound A | Second Electrochromic Layer | A+ | A+ | A+ |
| Example 1-2 | Example Compound 2 | First Electrochromic Layer | Example Compound A | Second Electrochromic Layer | A+ | A+ | A+ |
| Example 1-3 | Example Compound 3 | First Electrochromic Layer | Example Compound A | Second Electrochromic Layer | A+ | A+ | A |
| Example 1-4 | Example Compound 4 | First Electrochromic Layer | Example Compound A | Second Electrochromic Layer | A+ | A+ | A+ |
| Example 1-5 | Example Compound 5 | First Electrochromic Layer | Example Compound A | Second Electrochromic Layer | A+ | A+ | A+ |
| Example 1-6 | Example Compound 6 | First Electrochromic Layer | Example Compound A | Second Electrochromic Layer | A+ | A+ | A+ |
| Example 1-7 | Example Compound 7 | First Electrochromic Layer | Example Compound A | Second Electrochromic Layer | A | A | A |
| Example 1-8 | Example Compound 8 | First Electrochromic Layer | Example Compound A | Second Electrochromic Layer | A+ | A+ | A+ |

TABLE 1-continued

| | First Electrochromic Composition | | Second Electrochromic Composition | | | | |
|---|---|---|---|---|---|---|---|
| | Type of First Electrochromic Compound | Applied Position | Type of Second Electrochromic Compound | Applied Position | Test 1-1 | Test 1-2 | Test 3-3 |
| Example 1-9 | Example Compound 9 | First Electrochromic Layer | Example Compound A | Second Electrochromic Layer | A | A | A |
| Example 1-10 | Example Compound 10 | First Electrochromic Layer | Example Compound A | Second Electrochromic Layer | A | A | A |
| Example 1-11 | Example Compound 11 | First Electrochromic Layer | Example Compound A | Second Electrochromic Layer | A+ | A | A+ |
| Example 1-12 | Example Compound 12 | First Electrochromic Layer | Example Compound A | Second Electrochromic Layer | A+ | A | A+ |
| Example 1-13 | Example Compound 13 | First Electrochromic Layer | Example Compound A | Second Electrochromic Layer | A+ | A+ | A+ |
| Example 1-14 | Example Compound 14 | First Electrochromic Layer | Example Compound A | Second Electrochromic Layer | A+ | A+ | A+ |
| Example 1-15 | Example Compound 15 | First Electrochromic Layer | Example Compound A | Second Electrochromic Layer | A+ | A | A+ |
| Example 1-16 | Example Compound 16 | First Electrochromic Layer | Example Compound A | Second Electrochromic Layer | A+ | A+ | A+ |
| Example 1-17 | Example Compound 17 | First Electrochromic Layer | Example Compound A | Second Electrochromic Layer | A+ | A+ | A+ |
| Example 1-18 | Example Compound 18 | First Electrochromic Layer | Example Compound A | Second Electrochromic Layer | A+ | A | A |
| Example 1-19 | Example Compound 19 | First Electrochromic Layer | Example Compound A | Second Electrochromic Layer | A | B | B |
| Example 1-20 | Example Compound 20 | First Electrochromic Layer | Example Compound A | Second Electrochromic Layer | A | B | B |
| Example 1-21 | Example Compound 21 | First Electrochromic Layer | Example Compound A | Second Electrochromic Layer | A+ | A | A+ |
| Example 1-22 | Example Compound 22 | First Electrochromic Layer | Example Compound A | Second Electrochromic Layer | A+ | A | A+ |
| Example 1-23 | Example Compound 23 | First Electrochromic Layer | Example Compound A | Second Electrochromic Layer | A | A | A |
| Comparative Example 1-1 | Comparative Compound 1 | First Electrochromic Layer | Example Compound A | Second Electrochromic Layer | B | B | C |
| Comparative Example 1-2 | Comparative Compound 2 | First Electrochromic Layer | Example Compound A | Second Electrochromic Layer | C | C | B |
| Comparative Example 1-3 | Comparative Compound 3 | First Electrochromic Layer | Example Compound A | Second Electrochromic Layer | A | B | C |
| Comparative Example 1-4 | Comparative Compound 4 | First Electrochromic Layer | Example Compound A | Second Electrochromic Layer | C | C | B |
| Comparative Example 1-5 | Comparative Compound 5 | First Electrochromic Layer | Example Compound A | Second Electrochromic Layer | C | C | C |

It is clear from Table 1 that the electrochromic elements of Examples 1-1 to 1-23 deliver satisfactory repetition durability, continuous coloring property, and light durability. In particular, continuous driving stability and light durability are excellent. By contrast, the electrochromic elements of Comparative Examples 1-1 to 1-5 are insufficient in at least one of repetition durability, continuous coloring property, and light durability. Thus, the electrochromic composition according to the first embodiment contributes to improvement of continuous driving stability and light durability of the electrochromic element.

Example 2

Preparation of Second Electrochromic Element

Example 2-1

An electrochromic element of Example 2-1 was prepared as follows.

Formation of Spacer on First Electrode

An ITO glass substrate (having an area of 40 mm×40 mm, a thickness of 0.7 mm, and an ITO film thickness of about 100 nm) serving as a first electrode was coated with an isopropanol solution of gap control particles (MICROPEARL GS available from Sekisui Chemical Co., Ltd., having a particle diameter of 80 μm) and dried at 80 degrees C. for 3 minutes.

Formation of Anti-deterioration Layer on Second Electrode

Another ITO glass substrate (having an area of 40 mm×40 mm, a thickness of 0.7 mm, and an ITO film thickness of about 100 nm) serving as a second electrode was coated with a titanium oxide nanoparticle dispersion liquid (SP210 available from Showa Titanium Co., Ltd., having an average particle diameter of about 20 nm) by spin coating, to form an anti-deterioration layer. The coating layer was subjected to an annealing treatment at 120 degrees C. for 15 minutes. Thus, a nanostructural semiconductive material comprised of a titanium oxide particle film having a thickness of 1.0 μm was formed.

Bonding of Substrates

The ITO substrate as the first electrode and the ITO substrate as the second electrode were bonded to each other with the electrode surfaces facing each other and shifted 5 mm to form lead portions. The end faces of the bonded substrates were coated with a sealing material (TB 3050B available from ThreeBond Group) while leaving two injection holes. The bonded element was irradiated with ultraviolet ray (having a wavelength of 250 nm) emitted from a UV emitter (SPOT CURE available from Ushio Inc.) at 10 mW for 60 seconds.

Filling of Electrolyte Liquid

An electrolyte liquid containing the following materials was prepared.

Materials

Electrochromic compound 2 (Example Compound M1): 50 parts by mass

1-Ethyl-3-methylimidazoliumbisfluorosulfonylimide (EMIM-FSI) (available from Merk KGaA): 100 parts by mass N-methylpyrrolidone (NMP): 600 parts by mass The above-prepared electrolyte liquid in an amount of 30 mg was weighed with a micropipette and injected into the element from the injection holes. The injection holes were sealed with the sealing material and exposed to ultraviolet ray (having a wavelength of 250 nm) emitted from a UV emitter (SPOT CURE available from Ushio Inc.) at 10 mW for 60 seconds. Thus, an electrochromic element of Example 2-1, illustrated in FIG. 2, was prepared.

Coloring/Decoloring Drive Operation

Coloring/decoloring of the electrochromic element of Example 2-1 was confirmed in the same manner as the electrochromic element of Example 1-1. As a result, it was confirmed that, when a voltage of −2 V was applied for 5 seconds to between the lead portions of the first electrode and the second electrode, the color derived from the electrochromic compound 2 in the electrochromic layer was developed at the portion where the first electrode and the second electrode were overlapped. In was also confirmed that, when a voltage of +2 V was applied for 5 seconds to between the lead portions of the first electrode and the second electrode, the portion where the first electrode and the second electrode were overlapped was decolored and became transparent.

Examples 2-2 to 2-6

The procedure in Example 2-1 was repeated except for replacing the electrochromic compound 2 (Example Compound M1) with each of Example Compounds M2 to M6. Thus, electrochromic elements of Examples 2-2 to 2-6 were prepared.

Comparative Examples 2-1 to 2-5

The procedure in Example 2-1 was repeated except for replacing the electrochromic compound 1 (Example Compound M1) with each of the following Comparative Compounds m1 to m5. Thus, electrochromic elements of Comparative Examples 2-1 to 2-5 were prepared. It was confirmed that the color derived from the electrochromic compound 2 was developed in the electrochromic elements of Comparative Examples 2-1 to 2-6 as in the electrochromic element of Example 2-1.

Comparative Compound m1

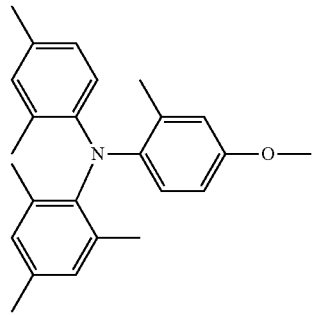

[Chem. 85]

Comparative Compound m2

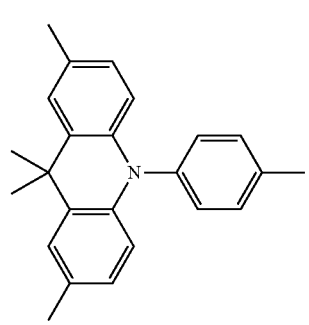

[Chem. 86]

Comparative Compound m3

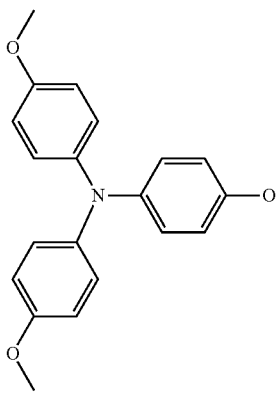

Comparative Compound m4

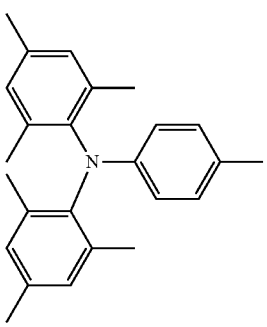

Comparative Compound m5

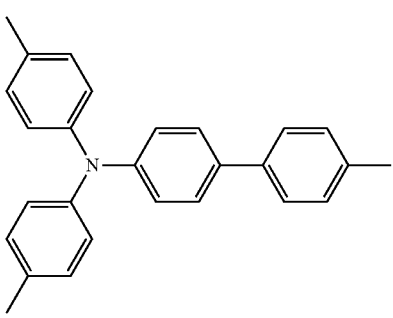

Comparative Compound m6

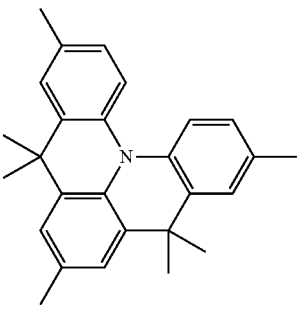

Evaluations

Each electrochromic element was subjected to a continuous coloring test, a light durability test, a color test, and a deteriorated matter analysis as follows.

Test 2-1: Continuous Coloring Test

In each of the electrochromic elements prepared in Examples and Comparative Examples, a voltage of 1.6 V was applied to between the first electrode and the second electrode, and the electrochromic element was maintained in the colored state for continuous 48 hours. The absorbance within a visible range (from 380 to 800 nm) was measured with a spectrometer USB4000 and a yellow index (YI) was calculated before and after the application of voltage. Continuous coloring property was evaluated by the difference ($\Delta$YI) in yellow index before and after the application of voltage based on the following criteria. The evaluation results are presented in Table 2.

Evaluation Criteria

A+: $\Delta$YI is less than 1.
A: $\Delta$YI is not less than 1 and less than 5.
B: $\Delta$YI is not less than 5 and less than 10.
C: $\Delta$YI is 10 or greater.

Test 2-2: Light Durability Test

Each of the electrochromic elements prepared in Examples and Comparative Examples was subjected to a light durability test conducted in the same manner as Test 1-2 described above. The evaluation results are presented in Table 2.

Test 2-3: Deteriorated Matter Analysis

After the Test 2-2, the sealing material of each electrochromic element was cut to take out the electrolyte liquid from the inside. The electrolyte liquid was dissolved in acetonitrile and analyzed by a liquid chromatography mass spectrometry (LC/MS) instrument (HPLC Alliance/TOF-MS LCT-Premier available from Waters Corporation). Cyclized products, from which one hydrogen molecule had been removed by a photochemical reaction, were detected by a photodiode detector (from 200 to 800 nm) and a mass spectrometer (APCI mode) and quantified by calculating the area ratio to the main component under the absorbance spectrum at 280 nm. The analysis results were evaluated based on the following criteria. The evaluation results are presented in Table 2.

Analysis Conditions

Column: Super ODS (having an inner diameter of 4.6 mm×100 mm, available from Tosoh Corporation)

Solvent: Mixed solvent of acetonitrile and water (the ratio of acetonitrile:water was changed from 50:50 to 100:0 with a linear gradient) within a time period of from 0 to 10 minutes, and 100% acetonitrile within a time period of from 10 to 15 minutes.

Evaluation Criteria

A: The generation rate of cyclized products from which one hydrogen molecule has been removed is less than 1%.

C: The generation rate of cyclized products from which one hydrogen molecule has been removed is 1% or greater.

TABLE 2

Electrochromic Compound 2

| | Type | Applied Position | Test 2-1 | Test 2-2 | Test 2-3 |
|---|---|---|---|---|---|
| Example 2-1 | Example Compound M1 | Electrolyte Layer | A+ | A+ | A |
| Example 2-2 | Example Compound M2 | Electrolyte Layer | A+ | A+ | A |
| Example 2-3 | Example Compound M3 | Electrolyte Layer | A+ | A+ | A |
| Example 2-4 | Example Compound M4 | Electrolyte Layer | A+ | A+ | A |
| Example 2-5 | Example Compound M5 | Electrolyte Layer | A+ | A+ | A |
| Example 2-6 | Example Compound M6 | Electrolyte Layer | A+ | A+ | A |
| Example 2-7 | Example Compound M7 | Electrolyte Layer | A+ | A+ | A |
| Example 2-8 | Example Compound M8 | Electrolyte Layer | A+ | A | A |
| Example 2-9 | Example Compound M9 | Electrolyte Layer | A+ | A+ | A |
| Example 2-10 | Example Compound M10 | Electrolyte Layer | A+ | A+ | A |
| Example 2-11 | Example Compound M11 | Electrolyte Layer | A+ | A+ | A |
| Example 2-12 | Example Compound M12 | Electrolyte Layer | A+ | A+ | A |
| Comparative Example 2-1 | Comparative Compound m1 | Electrolyte Layer | C | B | C |
| Comparative Example 2-2 | Comparative Compound m2 | Electrolyte Layer | A | A | C |
| Comparative Example 2-3 | Comparative Compound m3 | Electrolyte Layer | A | B | C |
| Comparative Example 2-4 | Comparative Compound m4 | Electrolyte Layer | C | C | A |
| Comparative Example 2-5 | Comparative Compound m5 | Electrolyte Layer | B | C | C |

It is clear from Table 2 that the electrochromic elements of Examples 2-1 to 2-12 deliver satisfactory continuous coloring property and light durability. In particular, continuous driving stability and light durability are excellent. By contrast, the electrochromic elements of Comparative Examples 2-1 to 2-6 are insufficient in continuous coloring property or light durability. In addition, it was confirmed that the electrochromic compound used in the electrochromic elements of Examples 2-1 to 2-6 generates very few cyclized products (carbazole derivatives), which are byproducts produced by light irradiation which degrade the properties of the electrochromic elements. By contrast, when the comparative compound m4 is used as an electrochromic compound as in Comparative Example 2-4, an electrochromic element having continuous driving stability and light durability cannot be provided although generation of cyclized products can be prevented by blocking the hydrogen atom at the position where the cyclized product is formed. Thus, the electrochromic compound according to the second embodiment contributes to improvement of continuous driving stability and light durability of the electrochromic element.

Example 3

Preparation of Third Electrochromic Element

Example 3-1

The procedure in Example 1-1 was repeated except that a mixture of Example Compound 1 with Example Compound B8 in the same amount (50 parts by mass) was used as the first electrochromic compound in the first electrochromic composition. Thus, an electrochromic element of Example 3-1 was prepared.

Coloring/Decoloring Drive Operation

Coloring/decoloring of the electrochromic element of Example 3 was confirmed in the same manner as the electrochromic elements of Examples 1 and 2. As a result, it was confirmed that, when a voltage of −2 V was applied for 5 seconds to between the lead portions of the first electrode and the second electrode, black color was observed at the portion where the first electrode and the second electrode were overlapped as the mixture of blue color and orange color derived from the electrochromic compounds in the electrochromic layers. In was also confirmed that, when a voltage of +2 V was applied for 5 seconds to between the lead portions of the first electrode and the second electrode, the colored portion was decolored and became transparent.

Comparative Examples 3-1 to 3-3

The procedure in Example 3-1 was repeated except for replacing the Example Compound 1 as the first electrochromic compound in the first electrochromic composition with each of the Comparative Compounds 1, 3, and 6. Thus, electrochromic elements of Comparative Examples 3-1 to 3-3 were prepared. It was also confirmed that black color was developed as the mixture of blue color and orange color in the electrochromic elements of Comparative Examples 3-1 to 3-3 as in the electrochromic element of Example 3-1.

Evaluations

Each electrochromic element was subjected to a repetition durability test and a continuous coloring test as follows.

Test 3-1: Repetition Durability Test

Each of the electrochromic elements prepared in Examples and Comparative Examples was subjected to a coloring/decoloring drive operation in which a voltage of −2 V was applied for 5 seconds and thereafter a voltage of +2 V for 5 seconds to between the lead portions of the first electrode and the second electrode. This coloring/decoloring drive operation was repeated 10,000 times. A visible transmittance $t_{max}$ within a visible range (from 400 to 800 nm) at the time of coloring was measured. A change in transmittance at that time was measured with a fiber multichannel spectrometer USB4000 (available from Ocean Optics, Inc.) and evaluated based on the following criteria. The evaluation results are presented in Table 3.

Evaluation Criteria

A+: The change in transmittance $t_{max}$ is 90% or more of the initial transmittance.

A: The change in transmittance $t_{max}$ is 80% or more of the initial transmittance.

B: The change in transmittance tax is 50% or more of the initial transmittance.

C: The change in transmittance $t_{max}$ is less than 50% of the initial transmittance.

Test 3-2: Continuous Coloring Test

In each of the electrochromic elements prepared in Examples and Comparative Examples, a voltage of 1.6 V was applied to between the first electrode and the second electrode, and the electrochromic element was maintained in the colored state for continuous 48 hours. The absorbance within a visible range (from 380 to 800 nm) was measured with a fiber multichannel spectrometer (USB4000 available from Ocean Optics, Inc.) and a yellow index (YI) was calculated before and after the application of voltage. Continuous coloring property was evaluated by the difference (ΔYI) in yellow index before and after the application of voltage based on the following criteria. The evaluation results are presented in Table 3.

Evaluation Criteria

A+: ΔYI is less than 1.
A: ΔYI is not less than 1 and less than 5.
B: ΔYI is not less than 5 and less than 10.
C: ΔYI is 10 or greater.

electrochromic elements of Examples 1 and 2. As a result, it was confirmed that, when a voltage of −2 V was applied for 5 seconds to between the lead portions of the first electrode and the second electrode, black color was observed at the portion where the first electrode and the second electrode were overlapped as the mixture of blue color and orange color derived from the electrochromic compounds in the electrochromic layers. In was also confirmed that, when a voltage of +2 V was applied for 5 seconds to between the lead portions of the first electrode and the second electrode, the colored portion was decolored and became transparent.

Comparative Examples 4-1 to 4-3

The procedure in Example 4-1 was repeated except for replacing the Example Compound M1 as the first electro-

TABLE 3

| | First Electrochromic Composition | | | Second Electrochromic Composition | | | |
|---|---|---|---|---|---|---|---|
| | First Type of First Electrochromic Compound | Second Type of First Electrochromic Compound | Applied Position | Type of Second Electrochromic Compound | Applied Position | Test 3-1 | Test 3-2 |
| Example 3-1 | Example Compound 1 | Example Compound B8 | First Electrochromic Layer | Example Compound A | Second Electrochromic Layer | A+ | A+ |
| Comparative example 3-1 | Comparative Compound 1 | Example Compound B8 | First Electrochromic Layer | Example Compound A | Second Electrochromic Layer | B | C |
| Comparative example 3-2 | Comparative Compound 3 | Example Compound B8 | First Electrochromic Layer | Example Compound A | Second Electrochromic Layer | A | B |
| Comparative example 3-3 | Comparative Compound 6 | Example Compound B8 | First Electrochromic Layer | Example Compound A | Second Electrochromic Layer | A | A |

It was confirmed that, in the electrochromic elements of Example 3-1 and Comparative Examples 3-1 to 3-3, black color was developed as the mixture of blue color and orange color. The black color was developed because a benzidine compound was contained in the first electrochromic composition.

It is clear from Table 3 that the electrochromic element of Example 3-1 delivers satisfactory repetition durability and continuous coloring property. In particular, continuous driving stability and light durability are excellent. By contrast, the electrochromic elements of Comparative Examples 3-1 to 3-3 are insufficient in repetition durability or continuous coloring property, which is slightly inferior. Thus, the first electrochromic composition according to the third embodiment contributes to improvement of continuous driving stability and light durability of the electrochromic element.

Example 4

Preparation of Fourth Electrochromic Element

Example 4-1

The procedure in Example 2-1 was repeated except that a mixture of Example Compound M1 with Example Compound B2 in the same amount (50 parts by mass) was used as the electrochromic compound 2. Thus, an electrochromic element of Example 4-1 was prepared.

Coloring/Decoloring Drive Operation

Coloring/decoloring of the electrochromic element of Example 4 was confirmed in the same manner as the chromic compound in the first electrochromic composition with each of the Comparative Compounds m2, m3, and m6. Thus, electrochromic elements of Comparative Examples 4-1 to 4-3 were prepared. It was also confirmed that black color was developed as the mixture of blue color and orange color in the electrochromic elements of Comparative Examples 4-1 to 4-3 as in the electrochromic element of Example 4-1.

Evaluations

Each electrochromic element was subjected to a repetition durability test and a continuous coloring test as follows.

Test 4-1: Repetition Durability Test

Each of the electrochromic elements prepared in Examples and Comparative Examples was subjected to a coloring/decoloring drive operation in which a voltage of −2 V was applied for 5 seconds and thereafter a voltage of +2 V for 5 seconds to between the lead portions of the first electrode and the second electrode. This coloring/decoloring drive operation was repeated 10,000 times. A visible transmittance $t_{max}$ within a visible range (from 400 to 800 nm) at the time of coloring was measured. Repetition durability was evaluated by the change in transmittance, measured with a spectrometer USB4000, based on the following criteria. The evaluation results are presented in Table 4.

Evaluation Criteria

A+: The change in transmittance $t_{max}$ is 90% or more of the initial transmittance.
A: The change in transmittance $t_{max}$ is 80% or more of the initial transmittance.

B: The change in transmittance $t_{max}$ is 50% or more of the initial transmittance.

C: The change in transmittance $t_{max}$ is less than 50% of the initial transmittance.

Test 4-2: Continuous Coloring Test

In each of the electrochromic elements prepared in Examples and Comparative Examples, a voltage of 1.6 V was applied to between the first electrode and the second electrode, and the electrochromic element was maintained in a colored state for continuous 48 hours. The absorbance within a visible range (from 380 to 800 nm) was measured with a spectrometer USB4000 and a yellow index (YI) was calculated before and after the application of voltage. Continuous coloring property was evaluated by the difference (ΔYI) in yellow index before and after the application of voltage based on the following criteria. The evaluation results are presented in Table 4.

Evaluation Criteria

A+: ΔYI is less than 1.
A: ΔYI is not less than 1 and less than 5.
B: ΔYI is not less than 5 and less than 10.
C: ΔYI is 10 or greater.

TABLE 4

| | Electrochromic Compound 2 | | | | |
|---|---|---|---|---|---|
| | First Type | Second Type | Applied Position | Test 4-1 | Test 4-2 |
| Example 4-1 | Example Compound M1 | Example Compound B2 | Electrolyte Layer | A+ | A+ |
| Comparative Example 4-1 | Comparative Compound m2 | Example Compound B2 | Electrolyte Layer | A | B |
| Comparative Example 4-2 | Comparative Compound m3 | Example Compound B2 | Electrolyte Layer | B | C |
| Comparative Example 4-3 | Comparative Compound m6 | Example Compound B2 | Electrolyte Layer | A | A |

It was confirmed that, in the electrochromic elements of Example 4-1 and Comparative Examples 4-1 to 4-3, black color was developed as the mixture of blue color and orange color. The black color was developed because a benzidine compound was contained in the first electrochromic composition.

It is clear from Table 4 that the electrochromic element of Example 4-1 delivers satisfactory repetition durability and continuous coloring property. In particular, continuous driving stability and light durability are excellent. By contrast, the electrochromic elements of Comparative Examples 4-1 to 4-3 are insufficient in repetition durability or continuous coloring property, which is slightly inferior. Thus, the electrochromic compound according to the fourth embodiment contributes to improvement of continuous driving stability and light durability of the electrochromic element.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

REFERENCE SIGNS LIST 10A, 10B Electrochromic element
11 First substrate
12 Display electrode (First electrode)
13 First electrochromic layer
14A, 14B Electrolyte layer
15 Second electrochromic layer
16 Counter electrode (Second electrode)
17 Second substrate

The invention claimed is:

1. An electrochromic compound, having a structure represented by the following General Formula (1):

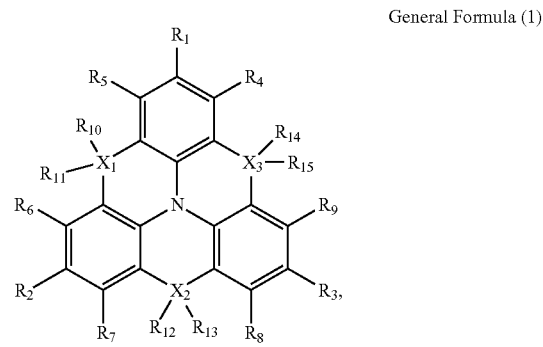

General Formula (1)

wherein each of $X_1$ to $X_3$ independently represents a carbon atom or a silicon atom, each of $R_1$ to $R_{15}$ independently represents a member selected from the group consisting of a hydrogen atom, a halogen atom, a monovalent organic group, and a polymerizable functional group, provided that one or more but two or less of $R_1$ to $R_3$ each represent a polymerizable functional group of the General Formula (i) or the General Formula (ii):

General Formula (i)

wherein $X_{1'}$ represents an alkenylene group, and

General Formula (ii)

wherein Y represents an alkyl group, an aralkyl group, an aryl group, a halogen atom, cyano group, nitro group, an alkoxy group, or —$COOR_{101}$ group, where $R_{101}$ represents a hydrogen atom, an alkyl group, an aralkyl group, an aryl group, or $CONR_{102}R_{103}$, where each of $R_{102}$ and $R_{103}$ independently represents a hydrogen atom, an alkyl group, an aralkyl group, or an aryl group, and wherein $X_{2'}$ represents an alkenylene group, wherein none of $R_1$ to $R_3$ represents a halogen atom, formyl group, carboxyl group, cyano group, an alkene, an alkyne, aryl group, or a heteroaryl group; and each of $R_{10}$ to $R_{15}$ independently represents an alkyl group or an aryl group.

2. The electrochromic compound according to claim 1, wherein the other of $R_1$ to $R_3$ which is not of the General Formula (i) or the General Formula (ii) represents an alkyl group, an alkoxy group, an aryloxy group, or a polymerizable functional group.

3. The electrochromic compound according to claim 1, wherein the polymerizable group is a (meth)acryloxy group.

4. An electrochromic compound, having a structure selected from the group consisting of:
Compound 1
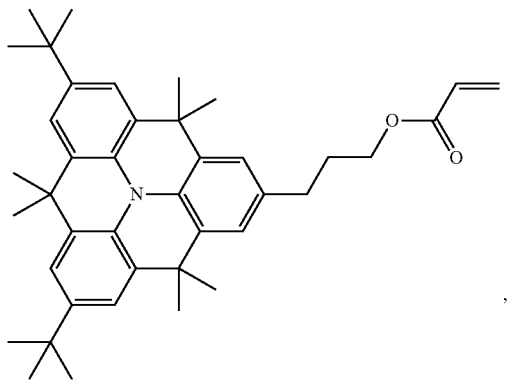
Compound 2
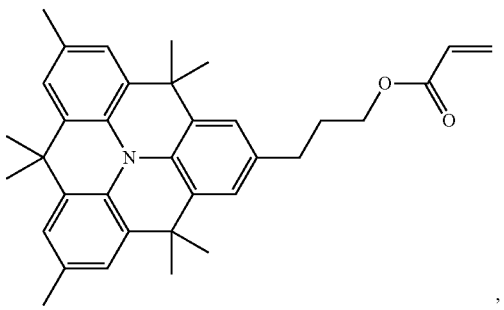
Compound 3
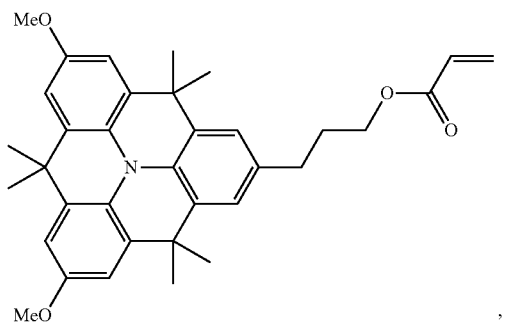
Compound 4
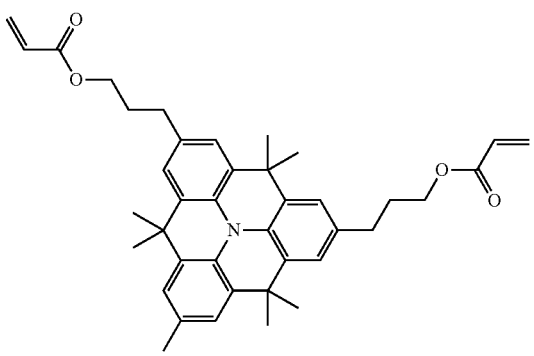
Compound 5
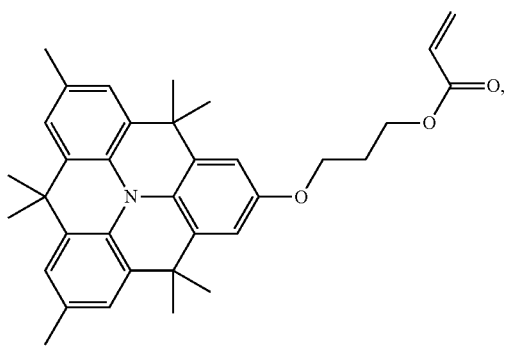
Compound 6
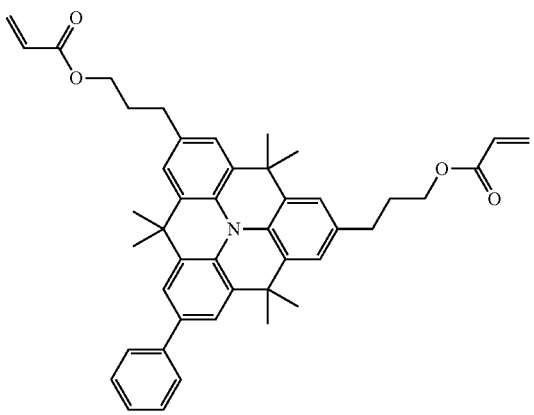

-continued
Compound 7
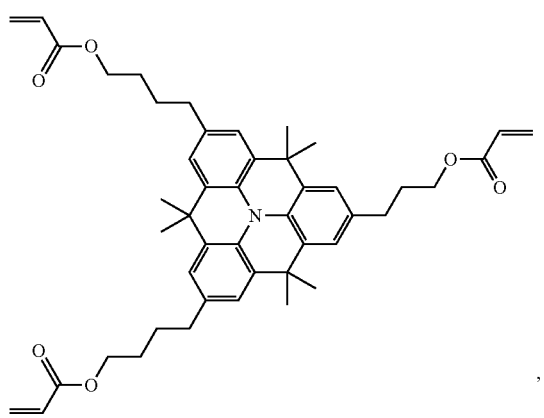
Compound 8
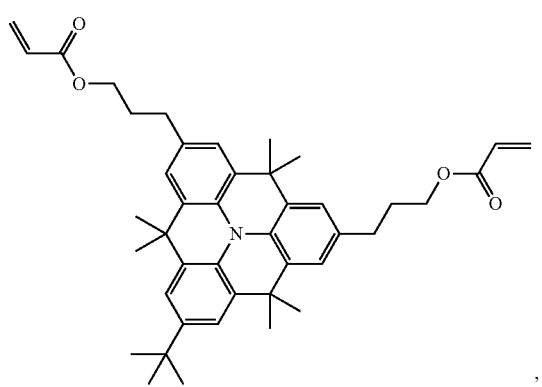
Compound 9
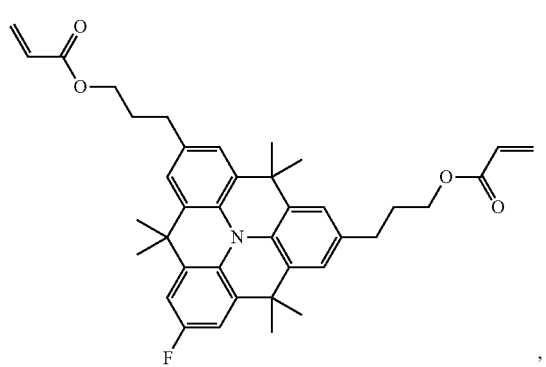
Compound 10
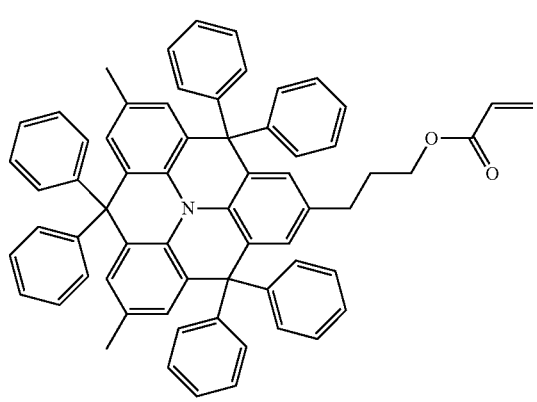
Compound 11
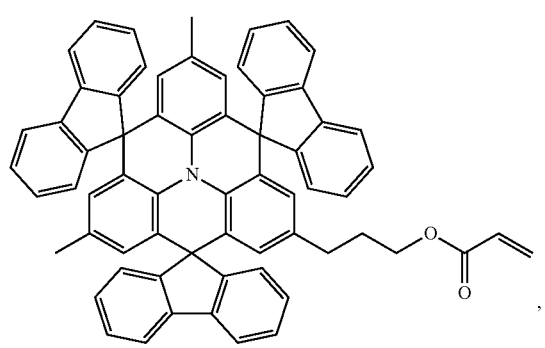
Compound 13
Compound 14
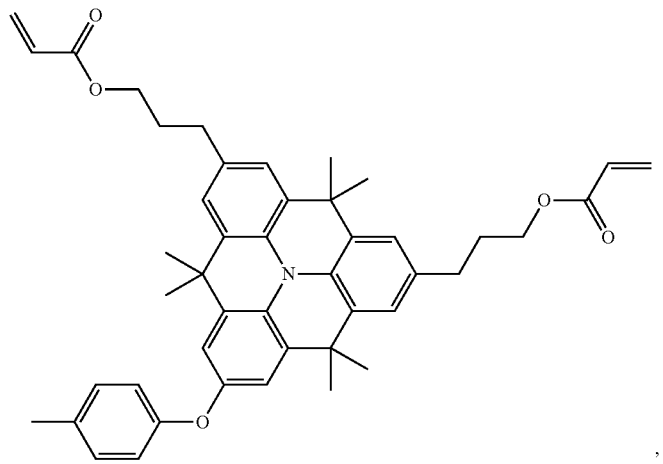

-continued
Compound 15
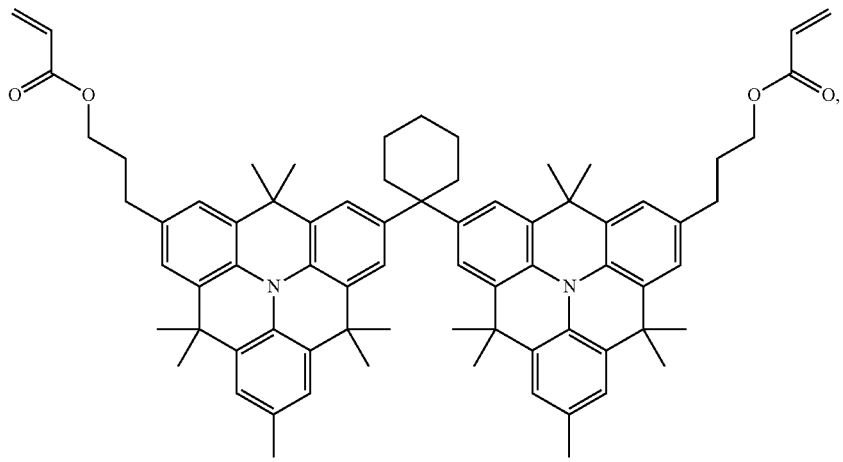
Compound 16
Compound 17
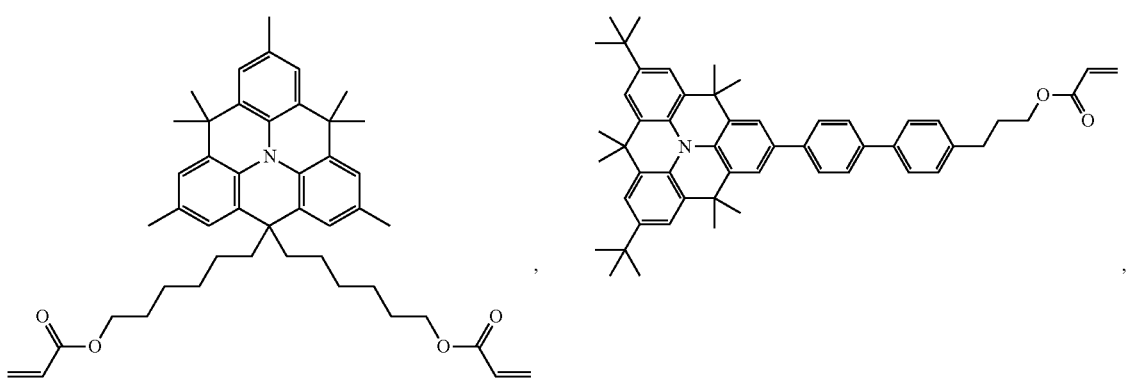
Compound 18
Compound 19
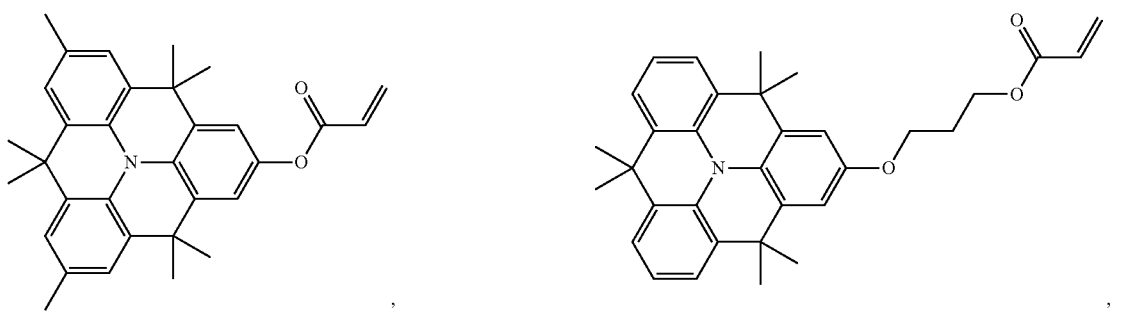
Compound 20
Compound 21
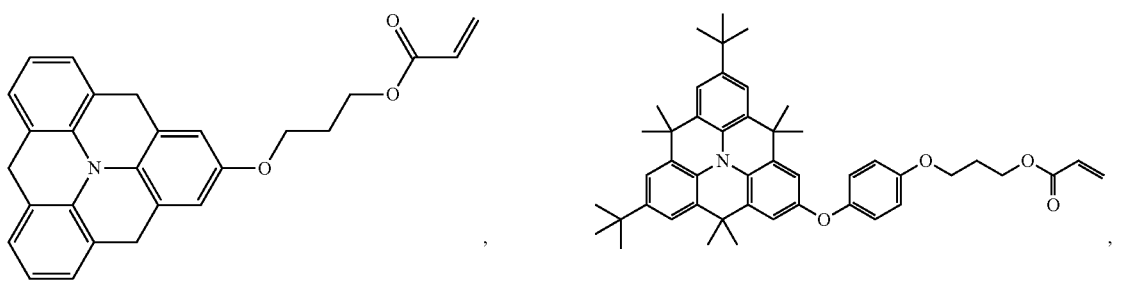

-continued
Compound 22
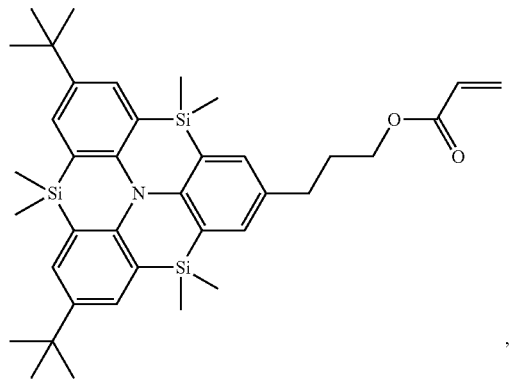
Compound 23
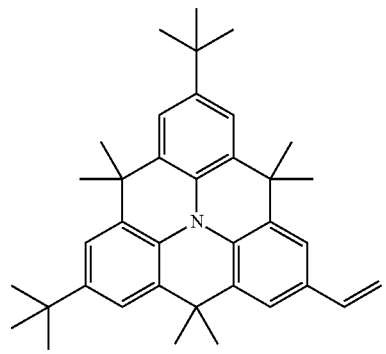
* * * * *